United States Patent
Kirst et al.

(10) Patent No.: US 9,372,107 B2
(45) Date of Patent: Jun. 21, 2016

(54) MEASURING SYSTEM FOR ASCERTAINING A VOLUME FLOW AND/OR A VOLUME FLOW RATE OF A MEDIUM FLOWING IN A PIPELINE

(71) Applicant: Endress + Hauser Flowtec AG, Reinach (CH)

(72) Inventors: Michael Kirst, Lorrach (DE); Alfred Rieder, Landshut (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/435,184

(22) PCT Filed: Sep. 23, 2013

(86) PCT No.: PCT/EP2013/069672
§ 371 (c)(1),
(2) Date: Apr. 13, 2015

(87) PCT Pub. No.: WO2014/056709
PCT Pub. Date: Apr. 17, 2014

(65) Prior Publication Data
US 2015/0268082 A1    Sep. 24, 2015

(30) Foreign Application Priority Data

Oct. 11, 2012  (DE) .......................... 10 2012 109 708
Oct. 12, 2012  (DE) .......................... 10 2012 109 729

(51) Int. Cl.
*G01F 1/84*    (2006.01)
(52) U.S. Cl.
CPC ....................... *G01F 1/849* (2013.01)
(58) Field of Classification Search
CPC .......................................................... G01F 1/84
USPC ............................................. 73/861.355–357
See application file for complete search history.

(56) References Cited

U.S. PATENT DOCUMENTS

| | | | | |
|---|---|---|---|---|
| 2006/0000293 A1* | 1/2006 | Rieder | ................. | G01F 1/8409 73/861.357 |
| 2009/0173169 A1* | 7/2009 | Bitto | .................... | G01F 1/8418 73/861.355 |
| 2011/0154912 A1* | 6/2011 | Kumar | ................. | G01F 1/8413 73/861.19 |
| 2011/0161017 A1* | 6/2011 | Kumar | ................. | G01F 1/8413 702/47 |
| 2011/0161018 A1* | 6/2011 | Kumar | ................. | G01F 1/8436 702/48 |

* cited by examiner

*Primary Examiner* — Jewel V Thompson
(74) *Attorney, Agent, or Firm* — Bacon & Thomas, PLLC

(57) ABSTRACT

The measuring system comprises: a vibration element for guiding flowing medium and having a lumen; and a vibration element, which is adapted to be contacted, at least at times, by a part of the medium. Additionally, the measuring system includes at least two oscillation exciters for exciting resonant oscillations of the respective vibration elements, two mutually spaced oscillation sensors for registering vibrations of the vibration element, each of which generates an oscillatory signal dependent on vibrations of the vibration element, as well as at least one oscillation sensor for registering vibrations of the vibration element and generating, dependent on vibrations of the vibration element, an oscillatory signal, which has a signal frequency corresponding to a resonant frequency, of the vibration element. Moreover, the measuring system also comprises a measuring and operating electronics, which based on a phase difference, existing between the oscillation signals and based on the signal frequency of the oscillation signal generates a measured value representing the volume flow rate, respectively the volume flow.

38 Claims, 11 Drawing Sheets

MEASURING SYSTEM FOR ASCERTAINING A VOLUME FLOW AND/OR A VOLUME FLOW RATE OF A MEDIUM FLOWING IN A PIPELINE

TECHNICAL FIELD

The invention relates to a measuring system for ascertaining a volume flow, namely a volume totally flowed during a predeterminable or earlier determined, measurement interval, and/or a volume flow rate of a medium, especially of a liquid or a gas, flowing in a pipeline, especially of a medium flowing at least at times with a mass flow rate of greater than 100 t/h.

BACKGROUND DISCUSSION

In process measurements and automation technology, for measuring physical parameters, such as e.g. the mass flow, respectively the mass flow rate, the volume flow, respectively the volume flow rate, as well as the density and/or the viscosity, of media flowing in pipelines, often such measuring systems are used—most often measuring systems formed as in-line measuring devices in compact construction—, which by means of a measuring transducer of vibration-type flowed-through by the medium and a measuring and driver circuit connected therewith, bring about reaction forces in the medium, such as e.g. Coriolis forces corresponding to the mass flow, inertial forces corresponding to the density of the medium and/or frictional forces corresponding to the viscosity of the medium, etc., and, derived from these forces, produce a measurement signal representing the respective mass flow, viscosity and/or density of the medium. Such measuring transducers, respectively measuring systems formed therewith, especially embodied in the form of Coriolis mass flow meters or Coriolis mass flow/densimeters, are described at length and in detail e.g. in CN-A 10 18 58 765, EP-A 1 001 254, EP-A 816 807, EP-A 553 939, US-A 2002/0157479, US-A 2006/0150750, US-A 2006/0162468, US-A 2007/0151368, US-A 2008/0047361, US-A 2010/0242623, US-A 2011/0016991, US-A 2011/0146416, US-A 2011/0154914, US-A 2011/0265580, US-2011/0113896, US-A 2012/0048034, US-A 2012/0073384, US-A 2012/0079891, US-A 2012/0090407, US-A 2012/0109543, US-A 2012/0167697, U.S. Pat. No. 4,777,833, U.S. Pat. No. 4,793,191, U.S. Pat. No. 4,801,897, U.S. Pat. No. 4,823,614, U.S. Pat. No. 4,879,911, U.S. Pat. No. 5,009,109, U.S. Pat. No. 5,024,104, U.S. Pat. No. 5,050,439, U.S. Pat. No. 5,370,002, U.S. Pat. No. 5,796,011, U.S. Pat. No. 5,804,741, U.S. Pat. No. 6,311,136, U.S. Pat. No. 6,308,580, U.S. Pat. No. 6,311,136, U.S. Pat. No. 6,415,668, U.S. Pat. No. 6,711,958, U.S. Pat. No. 6,920,798, U.S. Pat. No. 7,134,347, U.S. Pat. No. 7,392,709, U.S. Pat. No. 7,992,452, WO-A 00/57141, WO-A 01/067052, WO-A 03/027616, WO-A 2008/039203, WO-A 2011/008307, WO-A 2011/008308, WO-A 2011/019344, WO-A 2011/068500, WO-A 2012/028425, WO-A 90/15309, WO-A 90/15310, WO-A 94/21999, WO-A 96/05484, WO-A 97/33150, WO-A 98/038479 and also the not pre-published German patent application 102011089808.5.

Each measuring transducer includes a housing, of which an inlet-side first housing end is formed at least partially by means of a first flow divider having at least two, in each case, mutually spaced, circularly cylindrical or conical, flow openings and an outlet-side second housing end formed at least partially by means of a second flow divider having at least two, in each case, mutually spaced, flow openings. In the case of some of the measuring transducers shown in U.S. Pat. No. 5,796,011, U.S. Pat. No. 7,350,421, US-A 2007/0151368, US-A 2011/0146416, US-A 2011/0146416 and e.g. US-A 2011/0265580, the housing comprises a rather thick walled, circularly cylindrical, tube segment, which forms at least a middle segment of the housing.

For guiding the medium, which flows at least at times and which is, in given cases, also multiphase, the measuring transducers comprise, furthermore, in each case, two—in the case, for instance, of US-A 2011/0146416, US-A 2011/0146416, respectively US-A 2011/0265580 four—measuring tubes, which are connected for flow through in parallel and composed of metal, especially steel or titanium, which are placed within the housing and held oscillatably therein by means of the aforementioned flow dividers. The measuring tubes thus form a vibration element and are, at times, also referred to as the inner part. A first of the equally-constructed and mutually parallel measuring tubes communicates with an inlet-side first measuring tube end with a first flow opening of the inlet-side first flow divider and with an outlet-side second measuring tube end with a first flow opening of the outlet-side second flow divider and a second of the measuring tubes communicates with an inlet-side first measuring tube end with a second flow opening of the first flow divider and with an outlet-side second measuring tube end with a second flow opening of the second flow divider. In the case of US-A 2011/0146416, US-A 2011/0146416, respectively US-A 2011/0265580, moreover, a third of the measuring tubes communicates with an inlet-side first measuring tube end with a third flow opening of the first flow divider and with an outlet-side second measuring tube end with a third flow opening of the second flow divider and a fourth of the measuring tubes communicates with an inlet-side first measuring tube end with a fourth flow opening of the first flow divider and with an outlet-side second measuring tube end with a fourth flow opening of the second flow divider. Each of the flow dividers includes, furthermore, in each case, a connecting flange with a sealing surface for the fluid tight connecting of the measuring transducer to line segments of the pipeline serving for supplying medium, respectively removing medium, from the measuring transducer.

The measuring tubes, consequently the vibration element formed therewith, are, for producing the above-mentioned reaction forces, caused to vibrate during operation, driven by at least one oscillation exciter serving for producing, respectively maintaining, mechanical oscillations, especially bending oscillations, of the measuring tubes in the so-called driven, or wanted, mode. The oscillations in the wanted mode (wanted mode oscillations) are most often, especially in the case of application of the measuring transducer as a Coriolis mass flow- and/or densimeter, embodied at least partially as lateral bending oscillations of each of the measuring tubes, in each case, about an imaginary oscillation axis, and, in the case of medium flowing through the measuring tubes, as a result of Coriolis forces induced therein, as additional, superimposed oscillations of equal frequency in the so-called Coriolis mode (Coriolis mode oscillations). Accordingly, the exciter mechanism, most often an electrodynamic exciter mechanism, in the case straight measuring tubes, is embodied in such a manner that therewith the at least two measuring tubes are excitable in the wanted mode at least partially, especially also predominantly, to opposite equal, consequently opposite equal bending oscillations, in a shared plane of oscillation differentially—thus by action of exciter forces acting simultaneously along a shared line of action, however, in opposed directions.

For registering vibrations of the vibration element, especially bending oscillations of the measuring tubes excited by means of the exciter mechanism, and for producing oscillation measurement signals representing vibrations of the vibration element, measuring transducers of the aforementioned type have, furthermore, in each case, a sensor arrangement, most often likewise an electrodynamic vibration sensor arrangement, reacting to relative movements of one or more of the measuring tubes. Typically, the vibration sensor arrangement is formed by means of an oscillation sensor registering inlet-side oscillations of the measuring tubes differentially—thus only relative movements of the measuring tubes—as well as an oscillation sensor registering outlet-side oscillations of the measuring tubes differentially, wherein each generates, dependent on vibrations of the vibration element, an oscillatory signal, which has a signal frequency corresponding to the instantaneous oscillation frequency of the vibration element, in such a manner that between the oscillatory signal of the inlet-side oscillation sensor and the oscillatory signal of the outlet-side oscillation sensor a relative phase difference exists dependent on the instantaneous mass flow rate. Each of the oscillation sensors, which are usually constructed equally to one another, is formed by means of a permanent magnet held on the first measuring tube and a cylindrical coil held on the second measuring tube and permeated by the magnetic field of the permanent magnet.

In operation, the above-described vibration element of the measuring transducer formed by means of the at least two measuring tubes is excited by means of the electro-mechanical exciter mechanism at least at times in the wanted mode to execute mechanical oscillations at at least one dominating, wanted, oscillation frequency. Selected as oscillation frequency for the oscillations in the wanted mode, in such case, is usually a natural instantaneous resonant frequency of the vibration element, which, in turn, essentially depends both on an eigenfrequency of the vibration element determined by, among other things, size, shape and material of the vibration element, as well as also on an instantaneous density of the medium contacting the vibration element. In given cases, this wanted oscillation frequency can be influenced significantly by an instantaneous viscosity of the medium. As a result of fluctuating density of the medium to be measured and/or as a result of media changes performed during operation, the wanted oscillation frequency during operation of the measuring transducer is naturally variable at least within a calibrated and, insofar, predetermined wanted frequency band, which has corresponding, predetermined, lower and upper limit frequencies. Based on the currently excited wanted oscillation frequency, namely an instantaneous resonant frequency of the vibration element, accordingly also the density of the medium can be ascertained with such measuring systems, respectively based on a combination of the wanted oscillation frequency and the mentioned phase difference between the oscillation signals of the oscillation sensors, also a volume flow rate, respectively a volume flow, can be ascertained with such measuring systems. For defining a free oscillatory length of the measuring tubes and, associated therewith, for adjusting the wanted frequency band, measuring transducers of the above-described type most often further comprise, for forming inlet-side oscillation nodes for opposite-equal vibrations, especially bending oscillations, of the two measuring tubes, at least one inlet-side coupling element, which is affixed to both measuring tubes spaced from the two flow dividers, as well as, for forming outlet-side oscillation nodes for opposite-equal vibrations, especially bending oscillations, of the measuring tubes, at least one outlet-side coupling element, which is affixed to both measuring tubes spaced both from the two flow dividers as well as also from the inlet-side coupling element. The coupling elements can additionally also influence an oscillation quality factor of the inner part, as well as also the sensitivity of the measuring transducer as a whole.

The respective measuring transducer is, furthermore, connected with a measuring and operating electronics of the measuring system serving for evaluation of the at least one oscillation measurement signal and for generating corresponding measured values representing, for example, the mass flow rate, the volume flow rate or the density. In the case of modern measuring systems of the type being discussed, such measuring and operating electronics, such as, for example, described in the above mentioned U.S. Pat. No. 6,311,136, are most often implemented by means of one or more microprocessors formed, in given cases, also as digital signal processors (DSP). Besides evaluating the oscillation measurement signal, the measuring and operating electronics serves also for generating at least one, for example, harmonic and/or clocked, driver signal for the at least one oscillation exciter acting on the vibration element, wherein the driver signal can be embodied as a broadband signal having a signal component with a signal frequency matching the resonant frequency of the vibrating element or, for example, also as a rather narrow band or harmonic signal with a single dominating signal component of matching signal frequency. Said signal component, respectively the driver signal as a whole, can be controlled, for example, as regards electrical current and/or voltage level. In the case of measuring systems of the type being discussed, the measuring and operating electronics is most often accommodated within at least one comparatively robust, especially impact-, pressure-, and/or weather resistant, electronics housing. The electronics housing can be arranged, for example, remotely from the measuring transducer and be connected with such only via a flexible line; it can, however, also, such as shown e.g. also in the above mentioned U.S. Pat. No. 5,796,011, be arranged directly on the measuring transducer or on a measuring transducer housing separately housing the measuring transducer, consequently its vibrating element. Moreover, it is, however, such as, among other things, shown in WO-A 01/29519, also quite usual, in given cases, to use modularly formed electronics accommodated in two or more separate housing modules for forming measuring systems of the type being discussed. Usually, the respective measuring and operating electronics is, furthermore, electrically connected via corresponding electrical lines to a superordinated electronic data processing system arranged most often spatially removed from the respective measuring system and most often also spatially distributed. The measured values produced by the respective measuring system are forwarded to the electronic data processing system near in time by means of a measured value signal correspondingly carrying the measured values. Measuring systems of the type being discussed are additionally usually connected by means of a data transmission network provided within the superordinated data processing system with one another and/or with corresponding electronic process controllers, for example, on-site programmable logic controllers or process control computers installed in a remote control room, where the measured values produced by means of the respective measuring system and digitized and correspondingly coded in suitable manner are forwarded. By means of such process control computers, the transmitted measured values can be further processed and visualized as corresponding measurement results e.g. on monitors and/or converted into control signals for other field devices, such as e.g. magnetically operated valves, electric motors, etc., embodied as actuating devices. Since modern measuring systems can most often be so directly monitored and, in given cases, controlled and/or configured from such control computers, operating data intended for the measuring system are equally sent in corresponding manner via the aforementioned data transmission networks, which are most often hybrid as regards the transmission physics and/or the transmission logic. Accordingly, the data processing system serves usually also to process the measured value signal delivered by the measuring system corresponding to the requirements of downstream data transmission networks, for example, suitably to digitize the signal and, in given cases, to convert it into a corresponding telegram, and/or on-site to evaluate it. For such purpose, there are provided in such data processing systems, electrically coupled with the respective connecting lines, evaluating circuits, which pre- and/or further-process, as well as, in case required, suitably convert, the measured values received from the respective measuring system. Serving for data transmission in such industrial data processing systems, at least sectionally, are fieldbusses, especially serial fieldbusses, such as e.g. FOUNDATION FIELDBUS, RACKBUS-RS 485, PROFIBUS, etc. fieldbusses, or, for example, also networks based on the ETHERNET standard, as well as the corresponding, most often comprehensively standardized, transmission protocols. Alternatively or supplementally, in the case of modern measuring systems of the type being discussed, measured values can be transmitted wirelessly per radio to the particular data processing system. Besides the evaluating circuits required for processing and converting the measured values delivered from the respectively connected measuring systems, such superordinated data processing systems have most often for supplying the connected measuring systems with electrical energy also electrical supply circuits, which provide, in given cases, directly fed from the connected fieldbus, a corresponding supply voltage for the respective measuring and operating electronics and drive the electrical currents flowing through the thereto connected electrical lines as well as the respective measuring and operating electronics. A supply circuit can, in such case, for example, be associated with exactly one measuring system, respectively a corresponding measuring and operating electronics, in each case, and together with the evaluating circuit associated with the respective measuring system, for example, united to form a corresponding fieldbus adapter, and be accommodated in a shared electronics housing, e.g. an electronics housing in the form of a top hat rail module. It is, however, also quite usual to accommodate supply circuits and evaluating circuits, in each case, in separate electronics housings, in given cases, electronics housings spatially remote from one another, and to connect them with one another correspondingly via external lines.

Development in the field of measuring systems with measuring transducers of vibration-type has reached a state, in which modern measuring systems of the described type can for a very broad application spectrum of flow measurement technology satisfy highest requirements as regards precision and reproducibility of measurement results. Thus, such measuring transducers, respectively the measuring systems formed therewith, are in practice applied for mass flow rates from only a few g/h (gram per hour) up to several t/min (tons per minute), in the case of pressures up to 10 MPa (megapascal) for liquids or even over 30 MPa for gases. The accuracy of measurement achieved, in such case, lies usually at, for instance, 99.9% of the actual value or more, respectively a measuring error of, for instance, 0.1%, wherein a lower limit of the guaranteed measurement range can lie at, for instance, 1% of the measurement range end value. Due to the high bandwidth of their opportunities for use, industrial grade measuring systems with measuring transducers of vibration-type are available with nominal diameters (corresponding to the caliber of the pipeline to be connected to the measuring transducer, respectively the caliber of the measuring transducer measured at the connecting flange), which lie in a nominal diameter range between 0.5 mm and 400 mm (millimeter) and at maximum nominal mass flow rate, for example, also of greater than 3000 t/h, in each case, with pressure losses of less than 0.1 MPa. A caliber of each measuring tube can in the case of large nominal diameters easily be greater than 80 mm.

In spite of the fact that, in the meantime, measuring transducers for use in pipelines with very high mass flow rates and, associated therewith, very large calibers of far above 100 mm are becoming available, there is still a significant interest in obtaining measuring transducers of high precision and low pressure loss also for yet larger pipeline calibers, for instance, 450 mm or more, respectively mass flow rates of 3000 t/h or more. Particularly the measuring transducers shown in the above mentioned US-A 2011/0265580 with a vibration element having four bent measuring tubes are without doubt suitable to be able to fulfill the requirements of, consequently to be able to be designed for, large nominal diameters from over 450 mm. This not least of all also in applications, in which also the volume flow rate, respectively the volume flow, are of special interest, such as, for instance, for applications in the petrochemicals industry or in the field of transport and handling of petroleum, natural gas, fuels, etc.

However, in industrial plants having pipelines with, at times, relatively tightly dimensioned lateral spacings between pipelines guiding the medium and thereto neighboring plant components, such conditions can significantly make difficult, respectively, at times, completely exclude use of measuring transducers, respectively measuring systems, having, depending on the manner of construction, comparatively large lateral dimensions. In contrast, such measuring transducers with four straight measuring tubes, such as are described, for example, in the above mentioned WO-A 2012/028425, US-A 2011/0146416, US-A 2012/0073384, US-A 2012/0079891, US-A 2012/0227512, can, in comparison to those with bent measuring tubes, in the case of equal nominal diameter clearly be dimensioned more compactly, whereby their use for applications with limited available space are, initially, definitely indicated. Measuring transducers of vibration-type, in the case of which the vibration element has straight measuring tubes, show, such as, among other things, also mentioned in US-A 2012/0073384, respectively U.S. Pat. No. 4,823,614, however, in comparison to such, in the case of which the vibration element is formed by means of two or more bent measuring tubes, an increased cross-sensitivity to mechanical loadings, be it from clamping forces introduced via the pipeline—mainly axial clamping forces, namely forces acting in the direction of the imaginary oscillation axis, respectively a measuring tube longitudinal axis parallel thereto—, respectively therefrom resulting mechanical stresses in the vibration element or through mechanical stresses in the vibration element as a result of thermally related, elastic deformation of the measuring tubes. This, such as already discussed in the mentioned US-A 2012/0073384, is quite true also for the case, in which the vibration element is formed by means of four straight measuring tubes, of which each has a caliber of greater than 60 mm.

Although the clamping forces have for the accuracy of measurement, with which mass flow, respectively the mass flow rate, is ascertained, only a small, respectively with little effort, for instance, by application of temperature- and/or strain sensors, compensable influence, the influence of clamping forces, respectively the therefrom resulting mechanical stresses in the vibration element, on the accuracy of measurement in the case of the density measurement is quite significant. Associated therewith, accordingly also the volume flow rate, respectively the volume flow derived therefrom, can have a correspondingly fluctuating accuracy of measurement. Making this more difficult is the fact that in measuring systems of the type being discussed the clamping forces are potentially larger, the higher is the mass flow rate nominally to be measured therewith, respectively the greater are the nominal diameters. Thus, applications, in which there is more an interest in precise measuring of high volume flow, respectively high volume flow rates, then in the precise ascertaining of mass flows, respectively mass flow rates, can lead, at times, to no longer tolerable measuring inaccuracies in the case of measuring systems of the type being discussed.

SUMMARY OF THE INVENTION

Starting from the above mentioned state of the art, it is, consequently, an object of the invention to provide a measuring system for ascertaining a volume flow and/or a volume flow rate of a medium in a pipeline based on vibrations of a vibration element formed by means of at least one measuring tube that has as little as possible or only low cross-sensitivity to possible changes of stress states in the vibration element, for instance, as a result of temperature changes, respectively gradients, within the vibration element and/or as a result of forces acting externally on the vibration element, such as e.g. clamping forces introduced via the connected pipeline, respectively, that enables an exact measuring of volume flow, respectively volume flow rates, also in the case of large pipelines of greater than 100 mm nominal diameter and/or in the case of mass flow rates of greater than 100 t/h, especially greater than 1000 t/h.

For achieving the object, the invention resides in a measuring system for ascertaining a volume flow, namely a total volume flow during a measurement interval, and/or a volume flow rate, of a medium, for example, a liquid or a gas, flowing in a pipeline. The measuring system of the invention comprises: a first vibration element having a lumen and formed, for example, by means of at least one straight measuring tube and/or a measuring tube insertable into the course of the pipeline, which first vibration element is adapted to guide in said lumen a part of the medium flowing with a first mass flow rate and, while that is happening, to be caused to vibrate—for example, with a resonant frequency; at least a first oscillation exciter for exciting vibrations of the first vibration element in such a manner that said first vibration element executes at least partially resonant oscillations, namely mechanical oscillations with a first resonant frequency, for example, a first resonant frequency dependent on a density of the medium; a first oscillation sensor for registering vibrations of the first vibration element, for example, resonant oscillations excited by means of the first oscillation exciter, which first oscillation sensor is adapted to generate, dependent on vibrations of the first vibration element, a first oscillatory signal, which has a signal frequency corresponding to the first resonant frequency; as well as at least a second oscillation sensor spaced from the first oscillation sensor for registering vibrations of the first vibration element, which second oscillation sensor is adapted to generate a second oscillatory signal dependent on vibrations of the first vibration element in such a manner that said second oscillatory signal has a signal frequency equal to the signal frequency of the signal component of the first oscillation signal, consequently corresponding to the first resonant frequency, as well as relative to the first oscillatory signal a phase difference dependent on the first mass flow rate.

Moreover, the measuring system of the invention comprises: a second vibration element, for example, one formed by means of at least one oscillatably held measuring tube and/or by means of at least one oscillatory rod, which second vibration element is adapted to be contacted at least at times by a part of the medium—for example, to be flowed through or around—and, while that is happening, to be caused to vibrate, for example with a resonant frequency; at least a second oscillation exciter for exciting vibrations of the second vibration element in such a manner that said second vibration element executes at least partially resonant oscillations, namely mechanical oscillations with a second resonant frequency, for example a second resonant frequency dependent on a density of the medium and/or differing from the first resonant frequency by more than 10 Hz; as well as at least a third oscillation sensor for registering vibrations of the second vibration element, which oscillation sensor is adapted to generate, dependent on vibrations of the second vibration element, a third oscillatory signal, which has a signal frequency corresponding to the second resonant frequency. Furthermore, the measuring system of the invention comprises: a measuring and operating electronics formed, for example, by means of two electronics modules communicating with one another and adapted, by means of the first, second and third oscillation signals, namely based on the phase difference existing between the first and second oscillatory signals and based on the signal frequency of the third oscillation signal, to generate a measured value representing the volume flow rate, and/or adapted, by means of the first, second and third oscillation signals, namely based on the phase difference existing between the first and second oscillatory signals and based on the signal frequency of the third oscillation signal, to generate a measured value representing the volume flow.

In a first embodiment of the invention, the second vibration element includes a lumen for guiding flowing medium. Developing this embodiment of the invention further, the second vibration element is, furthermore, adapted to guide in its lumen a part of the medium flowing with a second mass flow rate and, while that is happening, to be caused to vibrate, for example, with the second resonant frequency. For example, the first and second vibration elements can, in such case, be so adapted that the second mass flow rate, with which the part of the medium guided in the lumen of the second vibration element flows, is less than the first mass flow rate, with which the part of the medium guided in the lumen of the first vibration element flows. This can be achieved, for example, by giving the first vibration element a flow cross section, which is greater than the flow cross section of the second vibration element, respectively by providing the second vibration element with a flow resistance, which is greater than the flow resistance of the first vibration element.

In a second embodiment of the invention, the measuring and operating electronics is, furthermore, adapted, by means of the third oscillation signal, namely based on the signal frequency of the third oscillation signal corresponding to the second resonant frequency, to generate a measured value representing a density of the medium. Developing this embodiment of the invention further, the measuring and operating electronics is, furthermore, adapted to generate the measured value representing the density of the medium also by means of the first oscillation signal, for example based on its signal frequency corresponding to the first resonant frequency In a third embodiment of the invention, the measuring and operating electronics is adapted, by means of the first and second oscillation signal, namely based on the phase difference existing between the first oscillatory signal and the second oscillatory signal to generate a measured value representing the first mass flow rate.

In a fourth embodiment of the invention, the measuring and operating electronics is adapted to generate for the first oscillation exciter a first driver signal, which has a signal frequency corresponding to the first resonant frequency. Developing this embodiment of the invention further, the measuring and operating electronics is, furthermore, also adapted, for example, at least at times and/or simultaneously with the first driver signal, to generate a second driver signal for the second oscillation exciter, which has a signal frequency corresponding to the second resonant frequency, for example, in such a manner that the signal frequency of the second driver signal deviates by more than 10 Hz from the signal frequency of the first driver signal. Additionally, the measuring and operating electronics can be adapted to generate the first and second driver signals simultaneously, in such a manner that the signal frequency of the second driver signal corresponding to the second resonant frequency is less than the signal frequency of the first driver signal corresponding to the first resonant frequency, e.g. also in such a manner that the signal frequency of the second driver signal is less than 90% of the signal frequency of the first driver signal.

In a fifth embodiment of the invention, the first vibration element is connectable to the pipeline, for example, insertable into the course of the pipeline, in such a manner that the lumen of the mentioned vibration element communicates with a lumen of the pipeline.

In a sixth embodiment of the invention, the second vibration element is connectable to the pipeline in such a manner that its lumen communicates with a lumen of the pipeline.

In a seventh embodiment of the invention, the first and second vibration elements are adapted to be flowed through simultaneously by medium.

In an eighth embodiment of the invention, the first vibration element is connectable to the pipeline, for example, insertable into the course of the pipeline, in such a manner that the lumen of the mentioned vibration element communicates with a lumen of the pipeline and the second vibration element is connectable to the pipeline in such a manner that its lumen communicates with a lumen of the pipeline.

Developing this embodiment of the invention further, the first and second vibration elements are adapted to be flowed through simultaneously by medium.

In a ninth embodiment of the invention, the first vibration element is formed by means of at least one measuring tube, for example, a straight measuring tube and/or a measuring tube insertable into the course of the pipeline and/or a measuring tube having a caliber greater than 20 mm.

In a tenth embodiment of the invention, the second vibration element forms a bypass of the first vibration element.

In an 11th embodiment of the invention, the second vibration element is formed by means of at least one measuring tube, for example, a curved measuring tube and/or one bypassing the first vibration element and/or one having a caliber of less than 50 mm. Developing this embodiment of the invention further, the at least one measuring tube, by means of which the first vibration element is formed, has a caliber, which is greater than a caliber of the at least one measuring tube, by means of which the second vibration element is formed, for example, also in such a manner that the mentioned caliber of the at least one measuring tube, by means of which the first vibration element is formed, amounts to greater than 5-times, especially also greater than 10-times, the mentioned caliber of the at least one measuring tube, by means of which the second vibration element is formed.

In a eleventh embodiment of the invention, the second vibration element is formed by means of at least one measuring tube, for example, a curved measuring tube and/or a measuring tube connected for bypassing flow around the first vibration element and/or a measuring tube having a caliber of less than 50 mm, and the second vibration element is connectable to the pipeline by means of a first connection line, for example, a flexible and/or bent, first connection line, and by means of a second connection line, for example, a flexible and/or bent, second connection line.

In a 13th embodiment of the invention, it is provided that the first resonant frequency, with which the first vibration element is caused to vibrate, deviates from the second resonant frequency, with which the second vibration element is caused to vibrate.

In a 14th embodiment of the invention, it is provided that the second resonant frequency is less than the first resonant frequency, for example, in such a manner that the second resonant frequency is less than 90% of the first resonant frequency.

In a 15th embodiment of the invention, the first vibration element is formed by means of at least two straight measuring tubes connected, for example, for flow in parallel with one another.

In a 16th embodiment of the invention, the second vibration element is formed by means of at least two curved measuring tubes connected, for example, for flow in parallel with one another, for example, in such a manner that each of the at least two measuring tubes is connected to form a bypass of the first vibration element.

In a 17th embodiment of the invention, the first vibration element is formed by means of measuring tubes, for example, exactly four straight measuring tubes connected for flow in parallel with one another, for example, also equally-constructed measuring tubes.

In an 18th embodiment of the invention, it is provided that the first and second vibration elements are mechanically decoupled from one another in such a manner that each of the two vibration elements can vibrate independently of the respective other vibration element, and/or in such a manner that a lowest mechanical eigenfrequency of the first vibration element is different from a lowest mechanical eigenfrequency of the second vibration element, for example, in such a manner that the lowest mechanical eigenfrequency of the first vibration element is less than the lowest mechanical eigenfrequency of the second vibration element.

In a 19th embodiment of the invention, the second vibration element is, furthermore, adapted to be immersed in medium, respectively flowed on by medium.

In a 20th embodiment of the invention, the second vibration element is formed by means of at least one paddle, which is adapted to be immersed in medium, respectively flowed on by medium.

In a first further development of the invention, the measuring system further comprises a housing with a first housing end connectable to a first line segment of the pipeline and with a second housing end connectable to a second line segment of the pipeline, wherein at least the first vibration element is accommodated within a lumen of the housing.

In a first embodiment of the first further development, both the first as well as also the second housing end have, in each case, at least one flow opening of first type, namely a flow opening communicating, in each case, with the first vibration element. For example, namely the first vibration element can be formed by means of at least one measuring tube, which communicates with a first tube end with the first flow opening of first type of the first housing end and with a second tube end with the first flow opening of first type of the second housing end.

In a second embodiment of the first further development, it is, furthermore, provided that both the first as well as also the second vibration element are accommodated within one and the same lumen of the housing.

In a third embodiment of the first further development, it is, furthermore, provided that the second vibration element is held on the housing, for example, in such a manner that said second vibration element is accommodated within the housing.

In a fourth embodiment of the first further development, both the first as well as also the second vibration element are each formed by means of at least one measuring tube and both the first as well as also the second housing end have each at least one flow opening of first type, namely, communicating, in each case, with the first vibration element, thus a flow opening that communicates, in each case, with a tube end of the at least one measuring tube, by means of which the first vibration element is formed, and both the first as well as also the second housing end have, in each case, at least one flow opening of second type, namely a flow opening communicating, in each case, with the second vibration element, thus communicating, in each case, with a tube end of the at least one measuring tube, by means of which the second vibration element is formed.

In a fifth embodiment of the first further development, both the first as well as also the second vibration element are each formed by means of at least one measuring tube and both the first as well as also the second housing end have, in each case, at least one flow opening of first type, namely a flow opening communicating, in each case, with the first vibration element, and thus communicating with a tube end of the at least one measuring tube, by means of which the first vibration element is formed, and the first housing end includes two flow openings of second type, namely flow openings communicating, in each case, with the second vibration element, and thus communicating, in each case, with a tube end of the at least one measuring tube, by means of which the second vibration element is formed.

In a sixth embodiment of the first further development, the second vibration element is held on the housing in such a manner that said second vibration element is arranged outside of the housing. For example, the second vibration element can be placed on an outside of the housing, which is adapted to be contacted by the medium during operation of the measuring system In a second further development of the invention, the measuring system further comprises a first temperature sensor, for example a first temperature sensor contacting the first vibration element on a side facing away from its lumen, for registering a temperature of the first vibration element and adapted to generate a first temperature signal dependent on the mentioned temperature of the first vibration element, as well as a second temperature sensor, for example, a second temperature sensor placed on a side of the second vibration element not contactable by the medium, for registering a temperature of the second vibration element and adapted to generate a second temperature signal dependent on the mentioned temperature of the second vibration element, for example, also in order to generate by means of at least one of the temperature signals the measured value representing the volume flow rate, respectively the volume flow, and/or in order to activate by means of at least one of the temperature signals one of at least two different operating modes of the measuring system, in which measured values representing the volume flow rate, respectively the volume flow, are ascertained, in each case, according to another formula, namely the formula associated with the respective operating mode.

In a third further development of the invention, the measuring system further comprises at least one deformation sensor, for example, a deformation sensor contacting the first vibration element on a side facing away from its lumen and/or formed by means of a strain gauge, for registering an elastic deformation of the first vibration element, for example, a thermally related elastic deformation and/or an elastic deformation effected by force introduced into the measuring system via the pipeline, wherein the deformation sensor is adapted to generate a deformation signal dependent on the mentioned deformation of the first vibration element, for example, also in order to generate by means of the deformation signal the measured value representing the volume flow rate, respectively the volume flow, and/or in order to activate by means of the deformation signal one of at least two different operating modes of the measuring system, in which are ascertained measured values representing the volume flow rate, respectively the volume flow, in each case, according to another formula, namely the formula associated with the respective operating mode.

In a fourth further development of the invention, the measuring system further comprises at least a fourth oscillation sensor spaced from the third oscillation sensor for registering vibrations of the second vibration element, wherein the fourth oscillation sensor is adapted to generate a fourth oscillatory signal dependent on vibrations of the second vibration element, in such a manner that the fourth oscillatory signal has a signal frequency equal to the signal frequency of the third oscillation signal, consequently corresponding to the second resonant frequency, as well as relative to the third oscillatory signal a phase difference dependent on the second mass flow rate. The measuring and operating electronics can, in such case, for example, be adapted to generate the measured value representing the volume flow rate, respectively the measured value representing the volume flow, this by means of the fourth oscillation signal, namely based on the phase difference existing between the third and fourth oscillatory signals. Alternatively or supplementally, the measuring and operating electronics can, in such case, furthermore, also be adapted to generate, by means of the third and fourth oscillation signal, namely based on the phase difference existing between the third and fourth oscillatory signals, a measured value representing the second mass flow rate.

In a fifth further development of the invention, the measuring system further comprises a fluid control system for control of the second mass flow rate, for example, a fluid control system actuatable by means of an electromagnetic valve and/or a valve driven by the measuring and operating electronics and/or formed by means of a pump driven by the measuring and operating electronics.

A basic idea of the invention is to ascertain a volume flow rate, respectively a volume flow, by means, not least of all also in contrast to conventional measuring systems with only a single measuring transducer of vibration-type, of two measuring transducers of vibration-type joined together to form a measuring transducer composite, of which two measuring transducers one is principally adapted for generating two oscillation signals with a phase difference correlated with the mass flow rate of the medium flowing in the measuring transducers, while the other of the two measuring transducers is adapted principally for generating at least one oscillation signal having a signal frequency correlated with the density of the medium guided in the measuring transducers. Due to the above-described dividing of the functions required for ascertaining volume flow rate, respectively volume flow, namely the generating of the phase difference, on the one hand, and the generating of the signal frequency, on the other hand, among, in each case, specially provided, self-sufficient, measuring transducers, it is in the case of the measuring system of the invention additionally possible to keep away possible mechanical loadings especially from the measuring transducer provided for generating the signal frequency and/or so to construct such measuring transducer that it is especially insensitive for such loadings, for instance, by application of only curved measuring tubes for guiding the volume portion of the medium required for measuring. As a result of this, the measuring system of the invention has a high accuracy of measurement, with which volume flow rate, respectively volume flow, can be ascertained.

A further advantage of the measuring system of the invention is, among other things, however, also that the measuring transducer serving principally for providing the phase difference correlated with the mass flow rate to be measured can be dimensioned essentially larger than the other measuring transducer serving principally for providing the signal frequency correlated with the density to be measured, whereby it is, for example, also possible to mount the latter on the housing provided in any event for the other measuring transducer, for example, also to arrange such within such housing, and so, in spite of the above-described dividing of the two individual measuring functions between two independent measuring transducers, for example, also so to be able to embody the measuring system that it appears externally as a single flow measuring device, in given cases, also with the installed dimensions usual for such flow measuring devices. Due to the above described measures, it is, in such case, additionally also directly possible to decouple the two measuring transducer sufficiently from one another as regards oscillation characteristics, so that they are, thus, in spite of their spatial nearness, largely independent of one another as regards their oscillatory behavior, respectively each of the two vibration element can vibrate independently of the respective other vibration element.

The measuring system of the invention can additionally, for example, also be produced by means of two conventional and/or also individually usable measuring transducers of vibration-type, which only need to be modified slightly such that medium to be measured flows through each of the two measuring transducers in the readied measuring system and both can be connected to the measuring and operating electronics ultimately delivering the desired measured values. Moreover, the measuring system formed in the above-described manner, namely by means of a measuring transducer composite comprising two measuring transducers of vibration-type can, for example, also be provided in very simple manner by joining, flow and signal appropriately, two otherwise independent measuring devices, namely a Coriolis mass flow measuring device as well as a vibronic, density measuring device.

BRIEF DESCRIPTION OF THE DRAWINGS

The invention as well as other advantageous embodiments thereof will now be explained in greater detail based on examples of embodiments, which are shown in the figures of the drawing. Equal parts are provided in all figures with equal reference characters; when perspicuity requires or it otherwise appears sensible, already mentioned reference characters are omitted in subsequent figures. Other advantageous embodiments or further developments, especially also combinations, of initially only individually explained aspects of the invention, result, furthermore, from the figures of the drawing. The figures of the drawing show as follows.

DETAILED DISCUSSION IN CONJUNCTION WITH THE DRAWINGS

Figure 1:
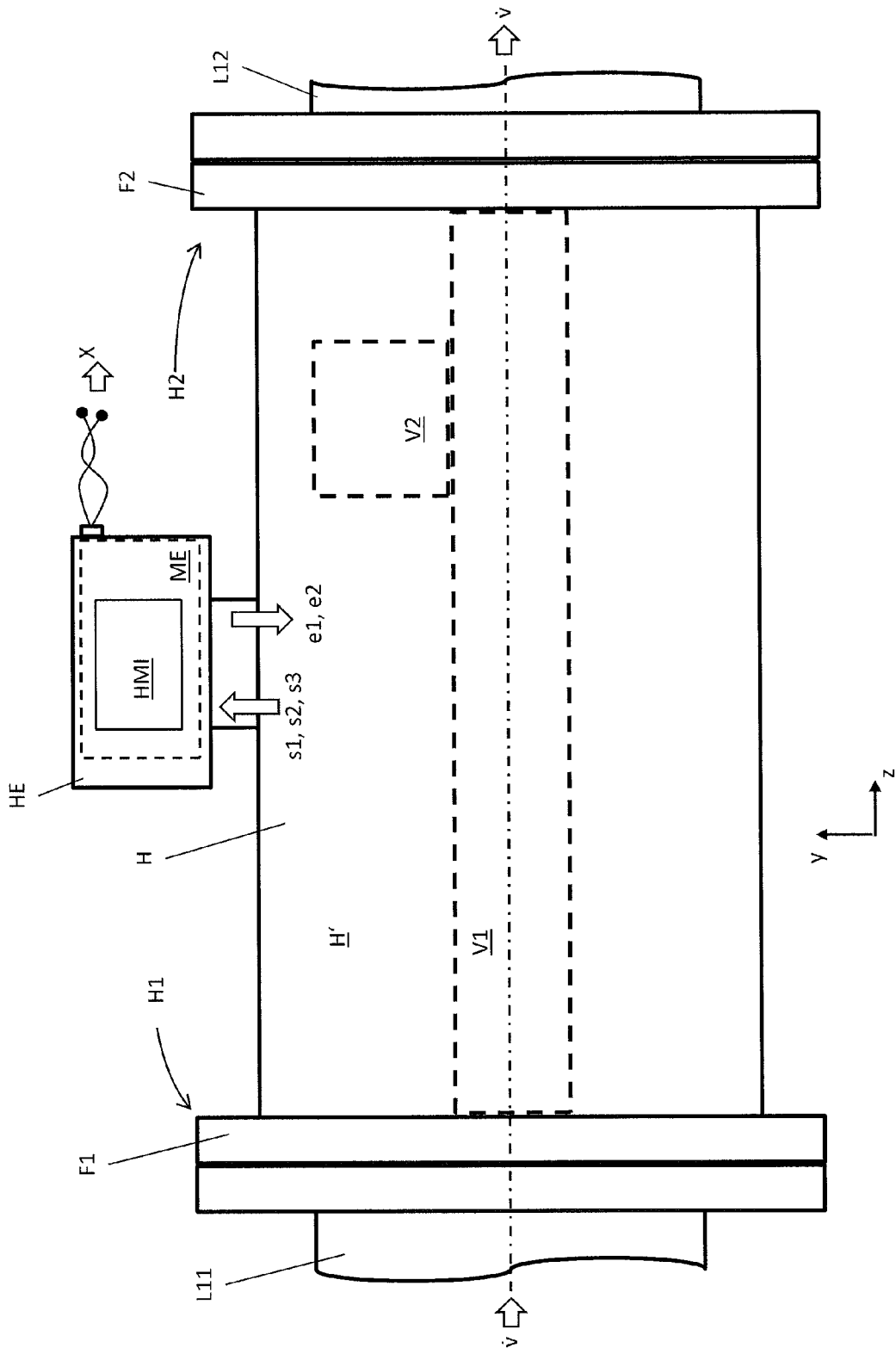
FIGS. 1, 2a and 2b are embodied as a measuring device of compact construction, a measuring system of industrial measurements and automation technology for measuring a volume flow rate and/or a volume flow of a medium flowing in a pipeline in different side views.

Shown schematically in FIGS. 1-9 in different views, respectively different variants of embodiments, is a measuring system for ascertaining a volume flow v, namely a total volume flowed during a predeterminable or earlier determined, measurement interval and/or a volume flow rate $\dot{v}$ of a medium, especially a liquid or a gas, flowing in a pipeline. The measuring system includes a measuring and operating electronics ME, especially one formed by means of at least one microprocessor and/or by means of a digital signal processor (DSP), for producing the measured values representing volume flow rate V, respectively volume flow v, respectively for outputting such a measured value as a currently valid, measured value X of the measuring system to a corresponding measurement output of the measuring and operating electronics ME. The measuring and operating electronics ME can, such as indicated in FIGS. 1 and 2a, 2b and 3, be accommodated in a single electronics housing HE of the measuring system. In case required, the measuring and operating electronics ME can, however, also, such as shown schematically, for example, also in FIG. 8, respectively 9, be formed by means of two mutually communicating electronics modules $ME_1$, $ME_2$, of which each is accommodated in one of two or more separate electronic housings HE, HE' of the measuring system. The measured values X generated by means of the measuring and operating electronics ME can, for example, be displayed on-site. For visualizing measuring system internally produced, measured values and/or, in given cases, measuring system internally generated, system status reports, such as, for instance, an error report or an alarm, the measuring system can have on-site, as indicated in FIG. 1, for example, a display and interaction element HMI communicating with the measuring and operating electronics and, in given cases, also designed to be portable, such as, for instance, an LCD-, OLED- or TFT-display placed in the electronics housing HE behind a window provided therein as well as a corresponding input keypad and/or touch screen. In advantageous manner, the measuring and operating electronics, for example, a (re-)programmable-, respectively remotely parameterable, measuring and operating electronics, can additionally be so designed that during operation of the measuring system it can exchange with a electronic data processing system superordinated to it, for example, a programmable logic controller (PLC), a personal computer and/or a work station, via a data transmission system, for example, a fieldbus system and/or wirelessly per radio, measuring and/or other operating data, such as, for instance, current measured values, system diagnosis values or, however, also control values serving for control of the measuring device. Furthermore, the measuring and operating electronics ME can be so designed that it can be fed from an external energy supply, for example, also via the aforementioned fieldbus system. For the case, in which the measuring system is provided for coupling to a fieldbus or other communication system, the measuring and operating electronics ME, for example, an on-site measuring and operating electronics ME and/or a measuring and operating electronics ME (re-)programmable via the communication system, can have a corresponding communication interface conforming to standards, especially one of the relevant industry standards, for data communication, e.g. for sending measured values representing measuring and/or operating data, consequently the volume flow v, respectively the volume flow rate $\dot{v}$, to the already mentioned programmable logic controller or to a superordinated process control system and/or for receiving setting data for the measuring system. Moreover, the measuring and operating electronics ME can have, for example, an internal energy supply circuit, which is fed during operation via the aforementioned fieldbus system from an external energy supply provided in the aforementioned data processing system. In such case, the measuring system can, for example, be embodied as a so-called four-conductor measuring device, in the case of which the internal energy supply circuit of the measuring and operating electronics ME is connected with an external energy supply by means of a first pair of lines and the internal communication circuit of the measuring and operating electronics ME with an external data processing circuit or an external data transmission system by means of a second pair of lines.

Besides the measuring and operating electronics ME, the measuring system of the invention comprises, furthermore, a first vibration element V1, which is adapted to guide in a lumen thereof a part of the medium flowing with a first mass flow rate $m_1$ and, while that is happening, to be caused to vibrate. Especially, the vibration element V1 is adapted to be inserted into the course of the pipeline and to be so connected to a first line segment L1 of the pipeline and to a second line segment L2 of the pipeline that the lumen of the vibration element V1 communicates with a respective lumen of each of the two line segments L1, L2 and at least one flow path is formed enabling fluid flow from the line segment L1, through the vibration element V1 and out the line segment L2. Furthermore, the measuring system comprises at least a first oscillation exciter E1, for example, a first oscillation exciter E1 electrically connected to the measuring and operating electronics by means of a pair of connection wires (not shown) and driven thereby, for exciting vibrations of the vibration element V1 in such a manner that the vibration element V1 executes, at least partially, resonant oscillations, namely mechanical oscillations with a first resonant frequency $f_{r1}$. Especially in such case, such resonant oscillations, at times, also referred to as wanted mode or drive oscillations, are excited, whose resonant frequency depends, on the one hand, in high measure also on a density $\rho$ of the medium, and has, on the other hand, an as high as possible sensitivity to changes of density, in order, consequently, to enable a high resolution of even slight density fluctuations. The measuring and operating electronics is, in such case, furthermore, adapted to generate, at least at times, an electrical, first driver signal e1 controlled, for example, to a predetermined voltage level and/or to a predetermined electrical current level, for the oscillation exciter E1, for example, an electrodynamic oscillation exciter E1 formed namely by means of a plunging armature, or solenoid, coil, which driver signal serves to feed the oscillation exciter E1 controlled at least with the electrical power required for exciting, respectively maintaining, the wanted mode oscillations and has a signal frequency corresponding to the (instantaneous) resonant frequency $f_{r1}$ of the vibration element V1.

For registering vibrations of the vibration element V1, not least of all resonant oscillations excited by means of the oscillation exciter E1, the measuring system further comprises a first oscillation sensor S1, for example, a first oscillation sensor S1 electrically connected to the measuring and operating electronics by means of an additional pair of connection wires (not shown), especially an electrodynamic first oscillation sensor S1, as well as, spaced from the first oscillation sensor S1, a second oscillation sensor S2, for example, one equally electrically connected to the measuring and operating electronics and/or having the same construction as the oscillation sensor S1. Oscillation sensor S1 is adapted to generate, dependent on vibrations of the vibration element 10, a first oscillatory signal s1, which has a signal frequency corresponding to the oscillation frequency of the wanted mode oscillations, consequently the instantaneously excited resonant frequency $f_{r1}$ of the vibration element V1, while the oscillation sensor S2 is adapted to generate a second oscillatory signal s2 dependent on vibrations of the vibration element V1, and, indeed, in such a manner that the oscillatory signal s2 has a signal frequency equal to the signal frequency of the first oscillation signal s1, consequently corresponding to the mentioned resonant frequency $f_{r1}$ of the vibration element V1, as well as a phase difference $\Delta_{\varphi 12}$ relative to the first oscillatory signal and dependent on the first mass flow rate $m_1$.

The oscillation exciter E1, as well as also the oscillation sensors s1, s2, such as usual in the case of such vibration elements, are arranged outwardly on the vibration element V1, namely on the outside not contacted by medium to be measured during operation. Said oscillation exciter E1 serves, especially, to convert electrical excitation power $P_{exc1}$ fed by means of the electrical driver signal e1 into exciter forces $F_{exc1}$, e.g. pulsating or harmonic exciter forces $F_{exc1}$, namely essentially sinusoidal exciter forces $F_{exc1}$, which act on the vibration element and, thus, actively excite the desired resonant oscillations. For example, the at least one driver signal e1 can simultaneously also have a plurality of sinusoidal signal components with signal frequencies differing from one another, of which a single component, for instance, a signal component dominating at least at times as regards signal power, has a signal frequency corresponding to the resonant frequency $f_{r1}$. The exciter forces $F_{exc}$ ultimately generated by converting electrical excitation power $P_{exc1}$ fed into the oscillation exciter E1 can be produced, in such case, in manner known, per se, to those skilled in the art, namely by means of a driver circuit provided in the measuring and operating electronics ME and providing the driver signal e1 based on signal frequency and signal amplitude of at least one of the sensor signals s1, s2 and output via an output channel. For ascertaining the instantaneous resonant frequency, respectively for tuning the corresponding signal frequency for the driver signal, there can be provided in the driver circuit, for example, a digital phase control loop (PLL, phase locked loop), while an electrical current level of the driver signal determinative for the magnitude of the exciter forces $F_{exc1}$, for example, can be suitably set by means of a corresponding electrical current controller of the driver circuit. The measuring and operating electronics can here e.g. also be embodied to control the driver signal e1 in such a manner that the resonant oscillations have a constant amplitude, thus also largely independent of the density ρ, respectively also the viscosity η, of the respective medium to be measured. Construction and application of the aforementioned phase control loop for the active exciting of vibration elements of the type being discussed to an instantaneous resonant frequency is described at length e.g. in U.S. Pat. No. 4,801,897. Of course, also other driver circuits suitable for tuning the exciter energy $E_{exc1}$, respectively the excitation power $P_{exc1}$, and known, per se, to those skilled in the art can be used, for example, also one of those according to the state of the art mentioned above, for instance one of those in the above mentioned U.S. Pat. No. 4,777,833, U.S. Pat. No. 4,801,897, U.S. Pat. No. 4,879,911, U.S. Pat. No. 5,009,109, U.S. Pat. No. 5,024,104, U.S. Pat. No. 5,050,439, U.S. Pat. No. 5,804,741, respectively U.S. Pat. No. 6,311,136. Furthermore, as regards application of such driver circuits, reference is made also to the measuring and operating electronics provided with measurement transmitters of the series, "PROMASS 100", "PROMASS 40", "PROMASS 80", "PROMASS 83" "PROMASS 84", such as are offered by the applicant, among other things, in connection also with the measuring transducers of the series, "PROMASS E", "PROMASS F", "PROMASS H", "PROMASS I", "PROMASS P", "PROMASS 5", respectively "PROMASS X" serving for measuring mass flow rate and density, for example, also as described via the Internet at http://www.us.endress.com/#products/~flow-measurment-flowmeter-coriolis masss.

In an additional embodiment of the invention, the measuring system comprises, furthermore, at least one housing H having a lumen H', especially one hermetically sealed from the surrounding atmosphere, in given cases, also one which is pressure and/or explosion resistantly sealed. Accommodated within the lumen H' is at least the first vibration element V1 together with the at least one oscillation exciter E1 as well as the two oscillation sensors S1, S2. Housing H is embodied essentially bending and twisting resistantly in comparison to the vibration element V1 and has additionally a first housing end H1 connectable, for example, by means of a flange connection, to the first line segment L11 of the pipeline as well as a second housing end H2 connectable, for example, by means of a flange connection, to the second line segment L12 of the pipeline. As directly evident from the combination of FIGS. 1, 2a, 2b and 3, consequently, the housing end H1 has at least a first flow opening $O_{i,11}$ of first type, namely a first flow opening communicating with the vibration element V1, and the housing end H2 has at least a first flow opening $O_{i,21}$ of first type, namely a first flow opening communicating with the vibration element V1. Moreover, each of the two housing ends includes, in each case, a corresponding connecting flange. Furthermore, the housing H can, as shown schematically in FIG. 1, have a neck like mounting post, on which the at least one electronics housing HE is mounted to form a measuring device of compact construction. Furthermore, arranged within the mounting post can be a feedthrough, for example, a feedthrough manufactured by means of glass- and/or plastic potting compound, a hermetically sealed feedthrough and/or pressure resistant feedthrough, for leading electrical connection wires from the measuring and operating electronics into the lumen H' of the housing H.

Figure 2A:
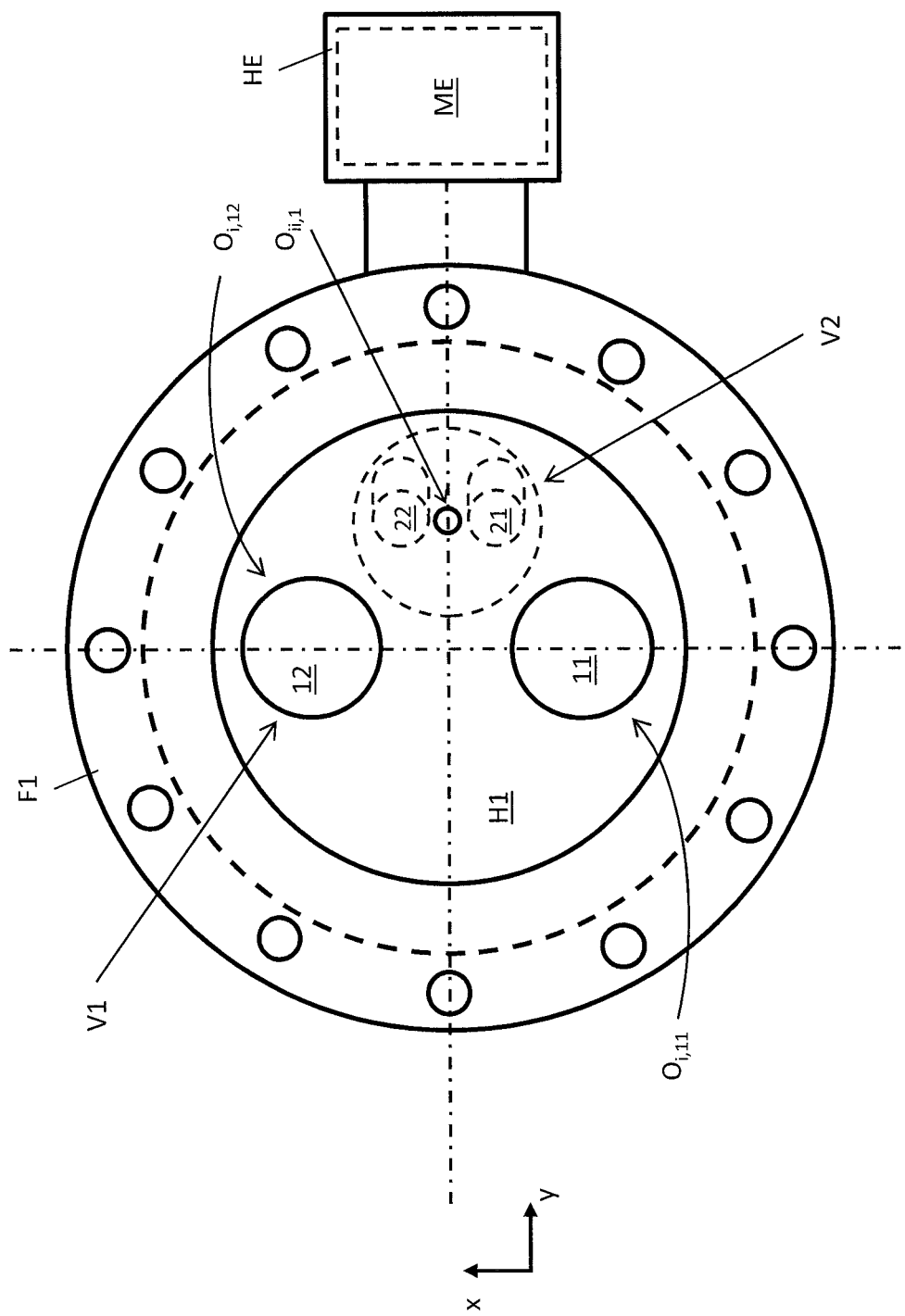
Figure 2B:
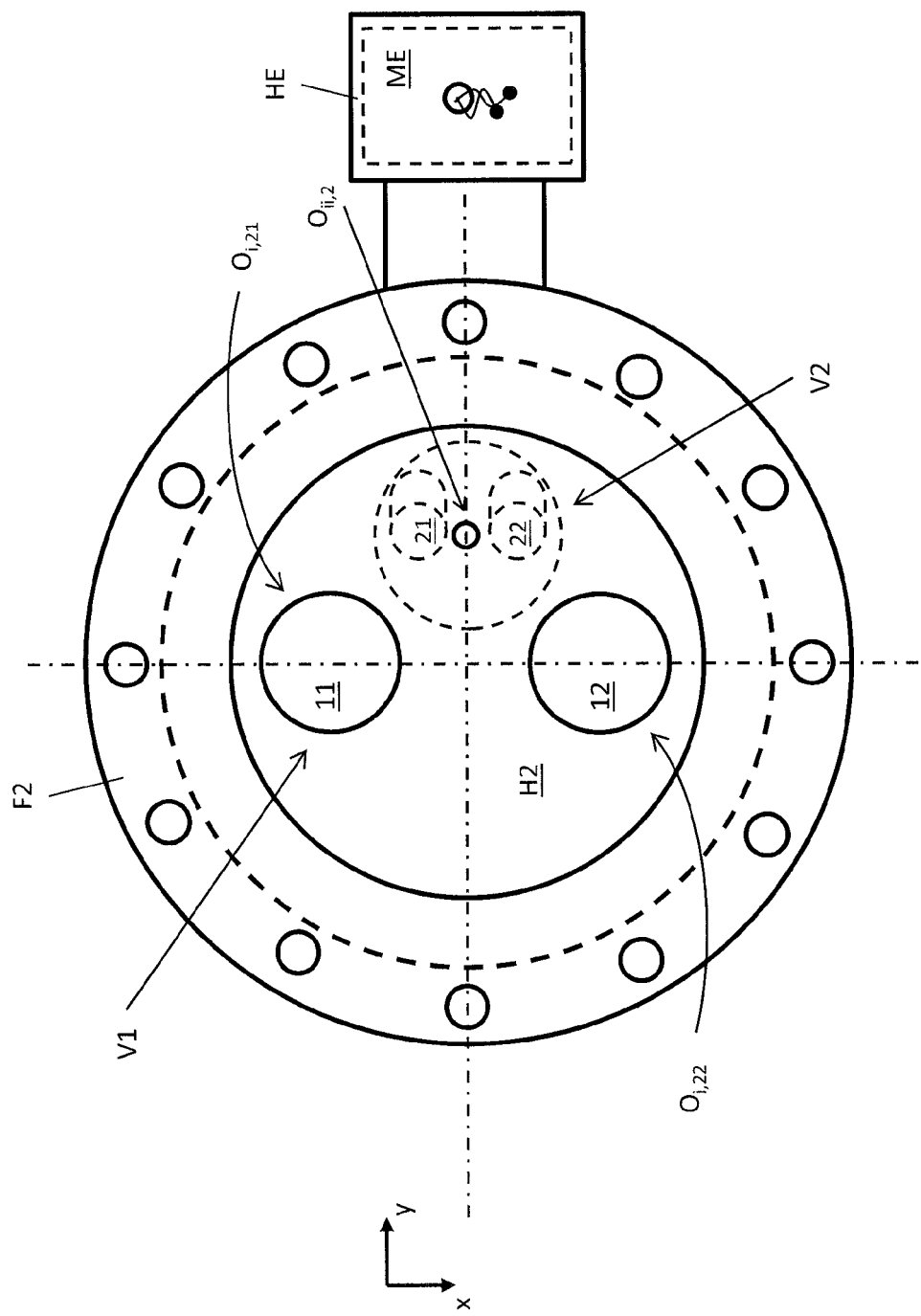
Figure 3:
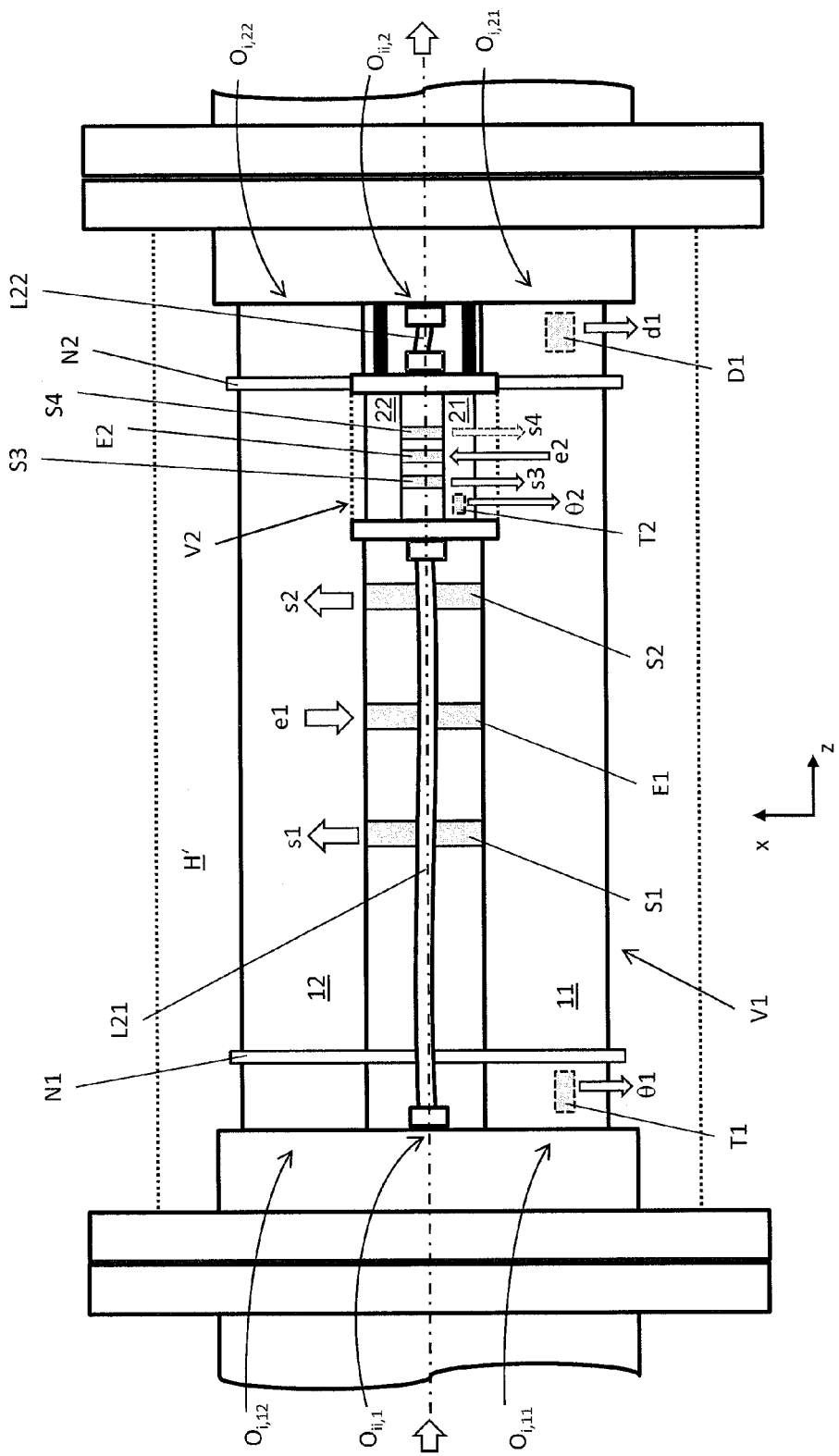
FIG. 3 is a schematic view of a measuring system of FIG. 1 with two vibration elements accommodated within one and the same housing, and flowed-through, in each case, by medium, at least at times, during operation of the measuring system.

The vibration element V1 of the measuring system of the invention is formed, as directly evident from the combination of FIGS. 1 to 3, by means of at least one measuring tube 11, for example, a measuring tube 11, which is straight and circularly cylindrical, of predeterminable caliber (DN11). During operation of the measuring system, measuring tube 11 is inserted into the course of the pipeline and, not least of all, also for the purpose of generating the mentioned resonant oscillations (wanted mode oscillations), caused to vibrate, at least temporarily, over a predetermined free oscillatory length. Measuring tube 11 can, such as usual in the case of such vibration elements used in industrial measuring systems, be, for example, a metal tube manufactured of a stainless steel or also of a titanium, tantalum and/or zirconium alloy and have a caliber of greater than 20 mm (DN11≥20 mm). Said measuring tube 11 communicates, such as directly evident from the combination of FIGS. 2a, 2b and 3, not least of all also for the purpose of providing the mentioned at least one flow path, via a first tube end with the flow opening $O_{i,11}$ of first type of the first housing end as well as via a second tube end with the flow opening $O_{i,21}$ of first type of the first housing end. Serving as actively excited, resonant oscillations can be, in such case, such as quite usual in the application of such vibration elements, for example, oscillations of a natural eigenmode of the vibration element V1 excited with its instantaneous resonant frequency, at which the at least one measuring tube 11 executes, at least partially, bending oscillations about an imaginary oscillation axis imaginarily connecting its two pipe ends, for example, in such a manner that the bending oscillations have only a single oscillatory antinode over the entire free oscillatory length. In the case of a straight measuring tube, the bending oscillations can additionally also be superimposed with torsional oscillations about the oscillation axis, for example, also torsional oscillations of same oscillation frequency as the bending oscillations and/or torsional oscillations of an additional eigenmode of the vibration element, in the case of which also the torsional oscillations have only a single oscillatory antinode over the entire free oscillatory length.

In an embodiment of the invention, the vibration element V1 is, as shown schematically in FIGS. 2a, 2b, 3, formed not by means of only a single measuring tube, but, instead, by means of at least two equally constructed measuring tubes arranged extending at least sectionally parallel to one another, thus, in this instance, by means of a first measuring tube 11 and at least one additional—second—measuring tube 12. This, especially, in such a manner that the vibration element V1, as shown by the combination of FIGS. 2a, 2b and 3, is formed by means of at least two straight, mutually parallel measuring tubes, which by forming as equally as possible long, free oscillatory lengths are only pointwise mechanically coupled, for example, by means of node plates N1, N2 affixed at the end regions of the measuring tubes, consequently, in each case, in the vicinity of one of the housing ends H1, H2.

The vibration element V1 can, in such case, additionally be so embodied that it corresponds, for example, to one of the vibration elements shown in the above mentioned US-A 2006/0162468, US-A 2007/0151368, US-A 2008/0047361, US-A 2011/0154914, US-A 2011/0016991, or US-A 2012/0048034.

In an additional embodiment of the invention, the measuring tubes 11, 12 are connected for parallel flow. For such purpose, each of the two housing ends H1, H2, such as shown schematically in FIG. 2a, respectively 2b, includes at least one other, second flow opening $O_{i,21}$, respectively $O_{i,22}$, of first type, of which, for the purpose of forming an additional flow path parallel to the earlier mentioned flow path, the flow opening $O_{i,12}$ accommodates a first tube end of the measuring tube 12 and the flow opening $O_{i,22}$ of the housing end H2 accommodates a second tube end of the measuring tube 12.

Figure 6:
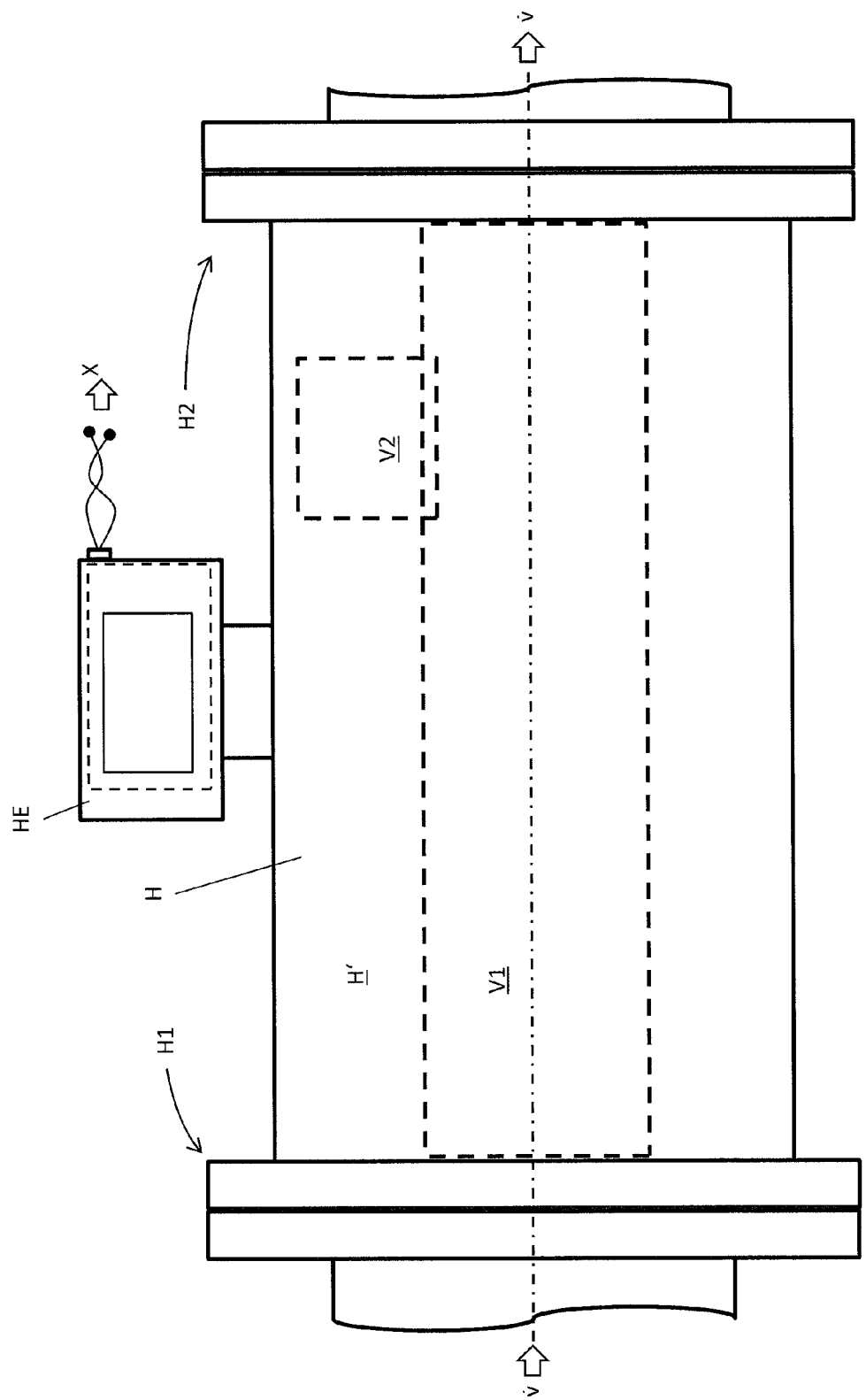
FIGS. 6, 7a and 7b are schematic views of another variant of embodiment for a measuring system according to FIG. 1 with, again, two vibration elements accommodated within one and the same housing, and flowed-through, in each case, by medium, at least at times, during operation of the measuring system, wherein one of the vibration elements is formed by means of four measuring tubes connected for parallel flow.
Figure 7A:
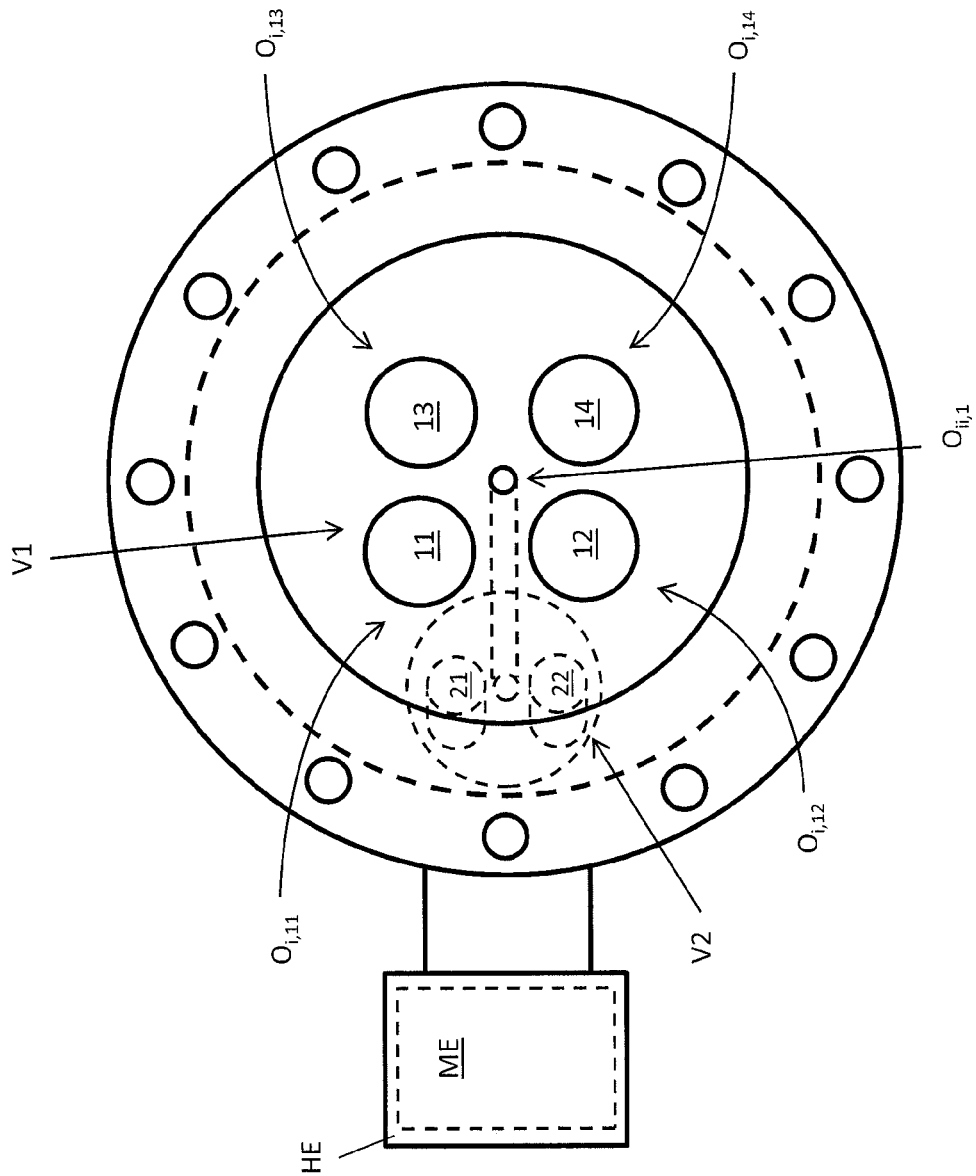
Figure 7B:
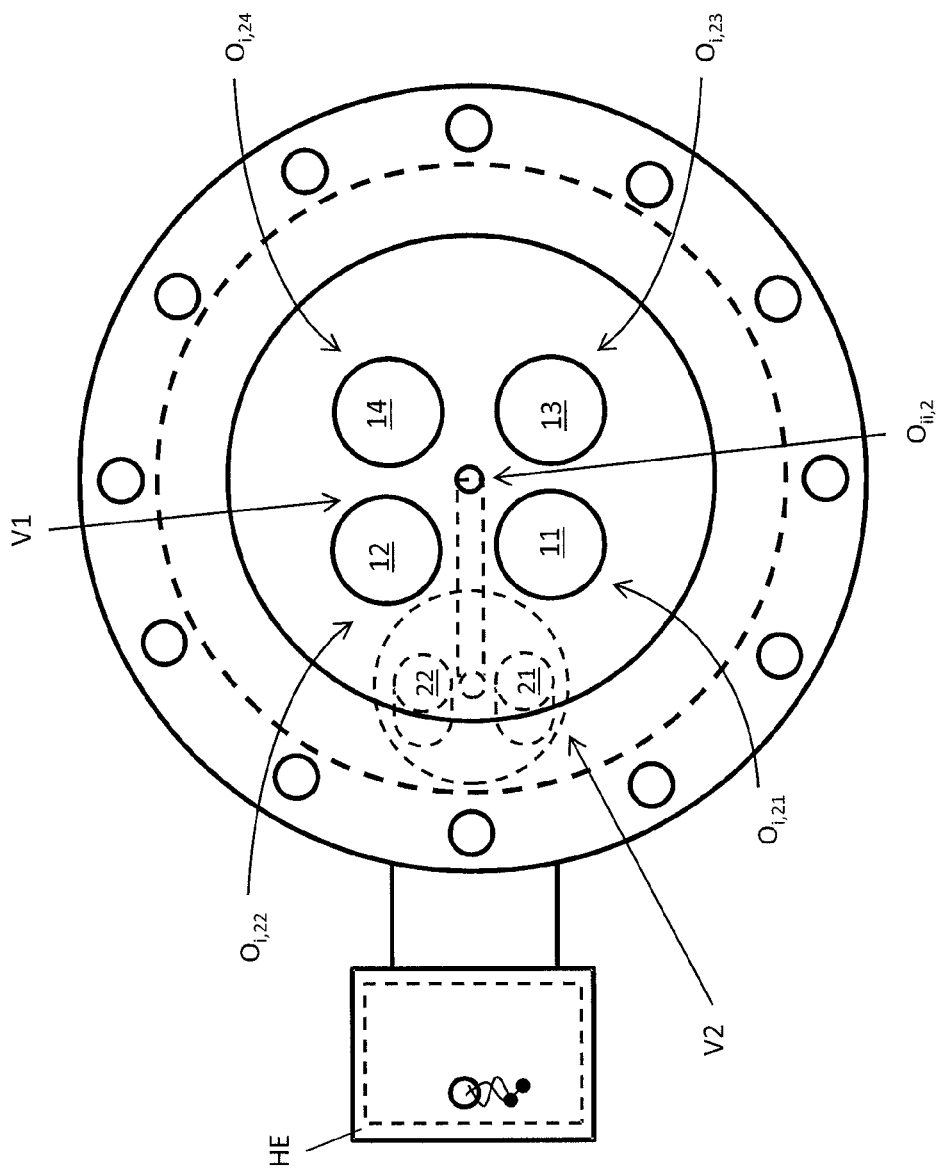
Figure 8:
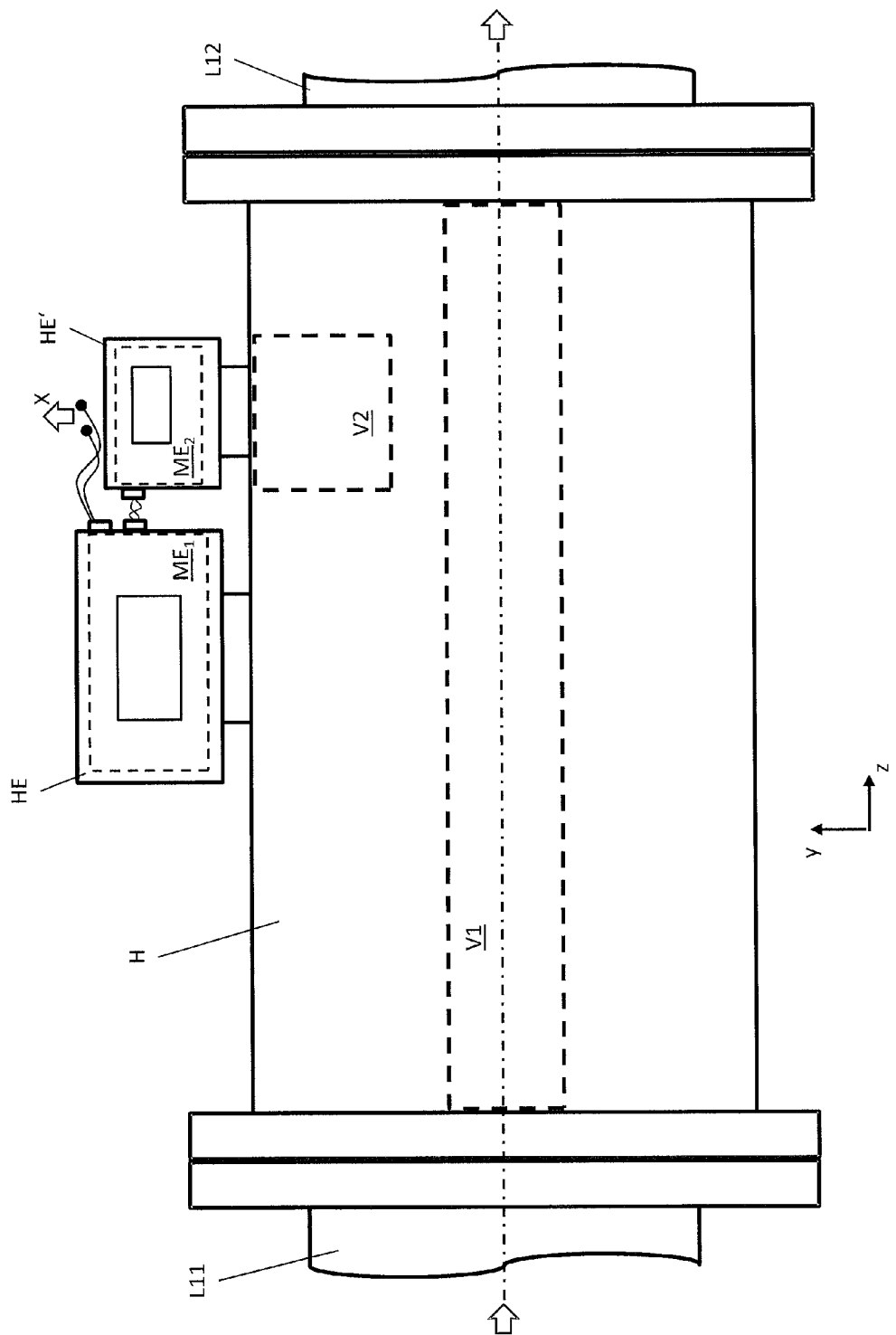
FIG. 8 is a schematic view of another variant of embodiment for a measuring system according to FIG. 1 with, again, two vibration elements accommodated within one and the same housing, and flowed-through, in each case, by medium, at least at times, during operation of the measuring system and with two, separate electronic modules communicating with one another.

As evident from a combination of FIGS. 6 and 7a, 7b, especially also in comparison with FIGS. 1 and 2a, 2b, the first vibration element V1 can, for example, also be formed by means of four equally-constructed, straight and mutually parallel measuring tubes 11, 12, 13 and 14, for example, thus corresponding to one of the vibration elements shown in the above mentioned US-A 2010/0050783, US-A 2010/0242623, respectively US-A 2012/0079891. This, especially, in such a manner that, for forming four paths for parallel flow, the housing end H1 has four flow openings $O_{i,11}$, $O_{i,12}$, $O_{i,13}$, $O_{i,14}$ of first type, of which each receives a respective first tube end of one of the four measuring tubes 11, 12, 13, respectively 14, and the housing end H2 likewise has four flow openings $O_{i,21}$, $O_{i,22}$, $O_{i,23}$, $O_{i,24}$ of first type, of which each receives a corresponding respective second tube end of the measuring tube 11, 12, 13, respectively 14. This variant of embodiment of the vibration element V1 is, as also disclosed in US-A 2010/0050783, US-A 2010/0242623 or US-A 2012/0079891, especially also suitable for measuring systems, which have a nominal diameter of greater than 100 mm, for example, thus 250 mm, 350 mm, 450 or more, and/or are provided for applications, in the case of which the medium can also flow with a mass flow rate of greater than 100 t/h, especially also greater than 1000 t/h.

As already mentioned, the measuring system of the invention serves during operation, especially, for ascertaining a volume flow and/or a volume flow rate of a medium flowing in a pipeline. Although the volume flow rate, and consequently the volume flow as integral of the volume flow rate ascertained recurringly in the mentioned measuring interval, can basically and as quite usual in the case of conventional measuring systems with vibration elements of the aforementioned type, also be ascertained just based on the oscillation signals s1, respectively s2, delivered by the two oscillation sensors S1, S2, namely based on the phase difference $\Delta_{\varphi 12}$ existing between the oscillation signals s1, s2 and based on the signal frequency of at least one of the oscillation signals s1, respectively s2, corresponding to the resonant frequency $f_{r1}$ of the vibration element V1, the measuring system of the invention includes, furthermore, a second vibration element V2, especially also one held on the housing H and/or oscillatably clamped in a bending and twist resistant frame, at least a second oscillation exciter E2 in active connection with the vibration element V2 and electrically connected to the measuring and operating electronics ME, especially an electrodynamic, second oscillation exciter E2, for exciting vibrations of the second vibration element V2, as well as at least a third oscillation sensor S3 likewise electrically connected to the measuring and operating electronics, especially an electrodynamic, third oscillation sensor S3, for registering vibrations of the vibration element V2. The vibration element V2 of the measuring system of the invention is further adapted, at least at times, to be contacted by a part of the medium and, while that is happening, to be caused to vibrate, excited by the oscillation exciter E2 in such a manner that also the vibration element V2 executes, at least partially, resonant oscillations, namely mechanical oscillations with a second resonant frequency $f_{r2}$ likewise co-determined by the density of the contacting medium. The oscillation sensor S3, in turn, generates, dependent on vibrations of the vibration element V2, a third oscillatory signal s3, which has a signal frequency corresponding to the resonant frequency $f_{r2}$. The oscillation signals supplied to the measuring and operating electronics are there conditioned in the usual manner, namely preamplified, filtered and digitized, and thereafter further evaluated computer-based by means of correspondingly programmed computer algorithms.

Since the measuring and operating electronics is fed both the oscillation signals s1, s2 representing the two oscillations of the first vibration element V1 as well as also the oscillation signal s3 representing the at least one oscillation of the second vibration element V2, it has available, as a result, first of all, information both concerning the mass flow rate $m_1$, namely in the form of the phase difference $\Delta_{\varphi r1}$ existing between the oscillation signals s1, s2, as well as also concerning the instantaneous density $\rho$ of the medium, namely in the form of the signal frequency of the oscillation signal s3. The measuring and operating electronics of the measuring system of the invention is, furthermore, adapted, by means of the first, second and third oscillation signals s1, s2, s3, namely based on the phase difference $\Delta_{\varphi 12}$ existing between the oscillation signals s1, s2 as well as based on the signal frequency of the oscillation signal s3 corresponding to the resonant frequency $f_{r2}$ of the vibration element V2, to generate, especially also recurringly, a measured value representing the volume flow rate $X_\nu$ and/or a measured value representing the volume flow $X_V$, respectively to output such as a valid measured value X ($X_\nu \rightarrow X$; $X_V \rightarrow X$). Especially, there are excited at the second vibration element V2 resonant oscillations, whose resonant frequency, on the one hand, correlates very well with the density to be ascertained for the medium, and which, on the other hand, also has an as high as possible sensitivity for possible changes of the density. Consequently, such resonant oscillations of the vibration element V2 serve in the case of the measuring system of the invention as wanted mode oscillations, which enable a high resolution of even slight density fluctuations. Accordingly, the measuring and operating electronics according to an additional embodiment of the invention is, furthermore, also adapted, at least at times, to generate a second driver signal e2 for the second oscillation exciter E2, which has a signal frequency corresponding to the (instantaneous) resonant frequency $f_{r2}$ of the second vibration element V2, wherein also the signal frequency analogously to the situation for the driver signal e1 is matched based on the sensor signal s3, especially also based on its signal frequency, by the measuring and operating electronics recurringly to the instantaneous resonant frequency $f_{r2}$ of the vibration element V2. For the purpose of generating the driver signal e2, the mentioned driver circuit of the measuring and operating electronics can, for example, supplementally to the mentioned output channel for the driver signal e1, have an additional, separate, output channel for driver signal e2, for example, an output channel formed by means of a corresponding phase-control loop for ascertaining the instantaneous resonant frequency $f_{r2}$, respectively for tuning the corresponding signal frequency for the driver signal e2 and an electrical current controller for tuning an electrical current level of the driver signal e2.

In an additional embodiment of the invention, the measuring and operating electronics is, furthermore, also adapted to generate the two driver signals e1, e2 at least at times also simultaneously, in such a manner that the first driver signal e1 has the signal frequency corresponding to the resonant frequency $f_{r1}$ of the first vibration element V1 and the second driver signal e2 the signal frequency corresponding to the resonant frequency $f_{r2}$ of the second vibration element V2, so that, as a result, the two vibration elements V1, V2 vibrate at the same time with their respective instantaneous resonant frequencies $f_{r1}$, respectively $f_{r2}$. Furthermore, the measuring and operating electronics can, in such case, also be so embodied, for instance, for the case, in which the density of the medium changes only very slowly and/or only in very small measures, and/or for the case, in which the density can temporarily also be measured sufficiently exactly based on the first and/or second oscillation signal s1, s2, that it generates the driver signal e1 for the first oscillation exciter E1 during a certain time period uninterruptedly, consequently the vibration element V1 is caused to vibrate uninterruptedly during a time period, and during this period of time the driver signal e2 for the second oscillation exciter E2 is delivered only at times and, thus, the vibration element V2 is caused to vibrate also only at times during this period of time, respectively is at times at rest.

In an additional embodiment of the invention, the measuring and operating electronics is, furthermore, adapted, based on the signal frequency of the oscillation signal s3 corresponding to the resonant frequency $f_{r2}$ of the vibration element V2, especially also recurringly, to produce a measured value $X_\rho$ representing the density $\rho$ of the medium flowing in the pipeline, respectively to output such as a valid measured value X ($X_\rho \to X$) and/or based on the phase difference $\Delta_{\phi 12}$ existing between the oscillation signals s1, s2 to produce, especially also recurringly, a measured value $X_m$ representing the mass flow rate $m_1$ of the medium flowing through the vibration element V1 and/or a mass flow rate of the medium flowing in the pipeline, respectively to output such as a valid measured value X ($X_m \to X$) of the measuring system. The measured value $X_\rho$ representing the density can be ascertained recurringly by the measuring and operating electronics based on a frequency measured value $X_{fr2}$ instantaneously representing the resonant frequency $f_{r2}$ of the vibration element V2 and based on the, per se, known formula for ascertaining density measured values:

$$X_\rho = a_{20} + a_{21} \cdot \frac{1}{X_{fr2}^2}, \quad (1)$$

wherein $a_{20}$, $a_{21}$ are measuring system specific coefficients resulting from the concrete mechanical construction of the vibration element V2. Said coefficients $a_{20}$, $a_{21}$ can be ascertained in, per se, known manner by means of earlier performed (wet-) calibration of the measuring system, in such a manner that they, as a result, account with smallest possible deviation for differences between predetermined actual mass flow rates and respective measured values $X_\rho$ ascertained by the measuring and operating electronics. The frequency measured value $X_{fr2}$ can, in turn, be ascertained, for example, based on the signal frequency of the sensor signal s3 corresponding to the resonant frequency $f_{r2}$, consequently be derived directly from the sensor signal s3, respectively from a corresponding digital signal. Alternatively or supplementally, the frequency measured value $X_{fr2}$ can, however, be derived, for example, also be ascertained, from the driver signal e2, respectively by means of the driver circuit generating the driver signal e2, e.g. also based on corresponding output values of the phase control loop serving for tuning the signal frequency of the driver signal e2.

Analogously to the measured value $X_\rho$ representing the density, additionally also the measured value $X_m$ representing the mass flow rate can be recurringly ascertained by the measuring and operating electronics based on a frequency measured value $X_{fr1}$ derived by means of the measuring and operating electronics equally from the oscillatory signal s1 and/or from the oscillatory signal s2 and instantaneously representing the resonant frequency $f_{r1}$ of the vibration element V1, a first phase measured value $X_{\Delta\phi 12}$ instantaneously representing the phase difference $\Delta_{\phi 12}$, and consequently recurringly ascertained, and based on the usual formula for ascertaining mass flow, measured values:

$$X_m = b_{10} + b_{11} \cdot \frac{X_{\Delta\varphi 12}}{X_{fr1}}. \quad (2)$$

The coefficients $b_{10}$, $b_{11}$ contained in this formula (2) are, again, measuring system specific, namely fixed by the concrete mechanical construction of the vibration element V1, and can likewise be ascertained by means of an earlier performed (wet-) calibration of the measuring system. The frequency measured value $X_{fr1}$ can, in turn, be ascertained from the sensor signal s1, respectively a corresponding digital signal, and/or from the driver signal e1. The frequency measured value $X_{fr1}$ can, however, for example, also be generated by means of the phase control loop serving for tuning the signal frequency of the driver signal e1. Alternatively or supplementally, the measuring and operating electronics can, such as quite usual in the case of measuring systems formed by means of vibration elements of the type being discussed, in given cases, also be adapted, consequently be used, based on the electrical excitation power fed-in for exciting and maintaining oscillations of at least one of the vibration elements, for example, the in any event excited resonant oscillations of at least one of the two vibration elements, in given cases, also under consideration of at least one of the oscillation signals, to ascertain a viscosity measured value $X_\eta$ representing viscosity $\eta$ of the fluid.

Furthermore, the measuring and operating electronics can additionally also be so embodied that it ascertains the measured value representing the volume flow rate $X_V$, respectively the measured value representing the volume flow $X_V$, based on the relationship $X_m/X_\rho$, respectively based on the formula:

$$\frac{X_m}{X_\rho} = \frac{b_{10} + b_{11} \cdot \frac{X_{\Delta\varphi 12}}{X_{fr1}}}{a_{20} + a_{21} \cdot \frac{1}{X_{fr2}^2}}. \quad (3)$$

The program code for such evaluating programs serving for generating measured values, respectively control programs serving for operating the vibration elements, can be stored persistently e.g. in manner commonly applied by those skilled in the art in a non-volatile data memory EEPROM of the measuring and operating electronics and be loaded at startup of the measuring and operating electronics into a volatile data memory RAM integrated e.g. in a microprocessor or a digital signal processor (DSP). Equally, measured values generated by means of the measuring and operating electronics ME can during operation be loaded into such a volatile data memory, in given cases, even the same volatile data memory, respectively into such a non-volatile data memory and held for later further processing.

Particularly for the purpose of achieving a largely, ideally completely, oscillatory decoupling of the two vibration elements V1, V2 from one another in such a manner that the two vibration elements, not least of all also in the respective wanted mode, can be caused to vibrate independently of one another, in given cases, also individually, respectively intermittently, without oscillatory energy being transmitted into the respective other vibration element, the vibration element V2 has, according to an additional embodiment of the invention, a resonant frequency $f_{r2}$, which differs by greater than 10 Hz from the resonant frequency $f_{r1}$ of the vibration element V1, especially also for the regularly occurring case, in which the two vibration elements V1, V2 are simultaneously contacted by the same medium, moreover, however, also have, in each case, a uniform temperature distribution. In advantageous manner, the two vibration elements V1, V2 are, in such case, so matched to one another that the resonant frequency $f_{r2}$ is less than the resonant frequency $f_{r1}$; this, especially, also in such a manner that the resonant frequency $f_{r2}$ of the vibration element V2 is less than 90% of the resonant frequency $f_{r1}$ of the vibration element V1. For mechanical decoupling of the two vibration elements V1, V2 in the aforementioned manner, these are, furthermore, so dimensioned that, at least in the case of uniform temperature distribution in the measuring system, a lowest mechanical eigenfrequency of the vibration element V1 corresponding to a lowest resonant frequency of the vibration element V1 not contacted by medium differs from a lowest mechanical eigenfrequency of the second vibration element V2, thus a lowest resonant frequency of the vibration element V2 not contacted by medium; this is accomplished, for example, in such a manner that the lowest mechanical eigenfrequency of the vibration element V1 is less than the lowest mechanical eigenfrequency of the vibration element V2. In corresponding manner, also the measuring and operating electronics, according to an additional embodiment of the invention, is adapted to generate the two driver signals e1, e2, simultaneously in such a manner that the signal frequency of the second driver signal e2 is less than the signal frequency of the first driver signal e1, for example, corresponds to less than 90% of the signal frequency of the driver signal e1, and/or that the signal frequency of the second driver signal e2 differs by more than 10 Hz from the signal frequency of the first driver signal e1.

Figure 4:
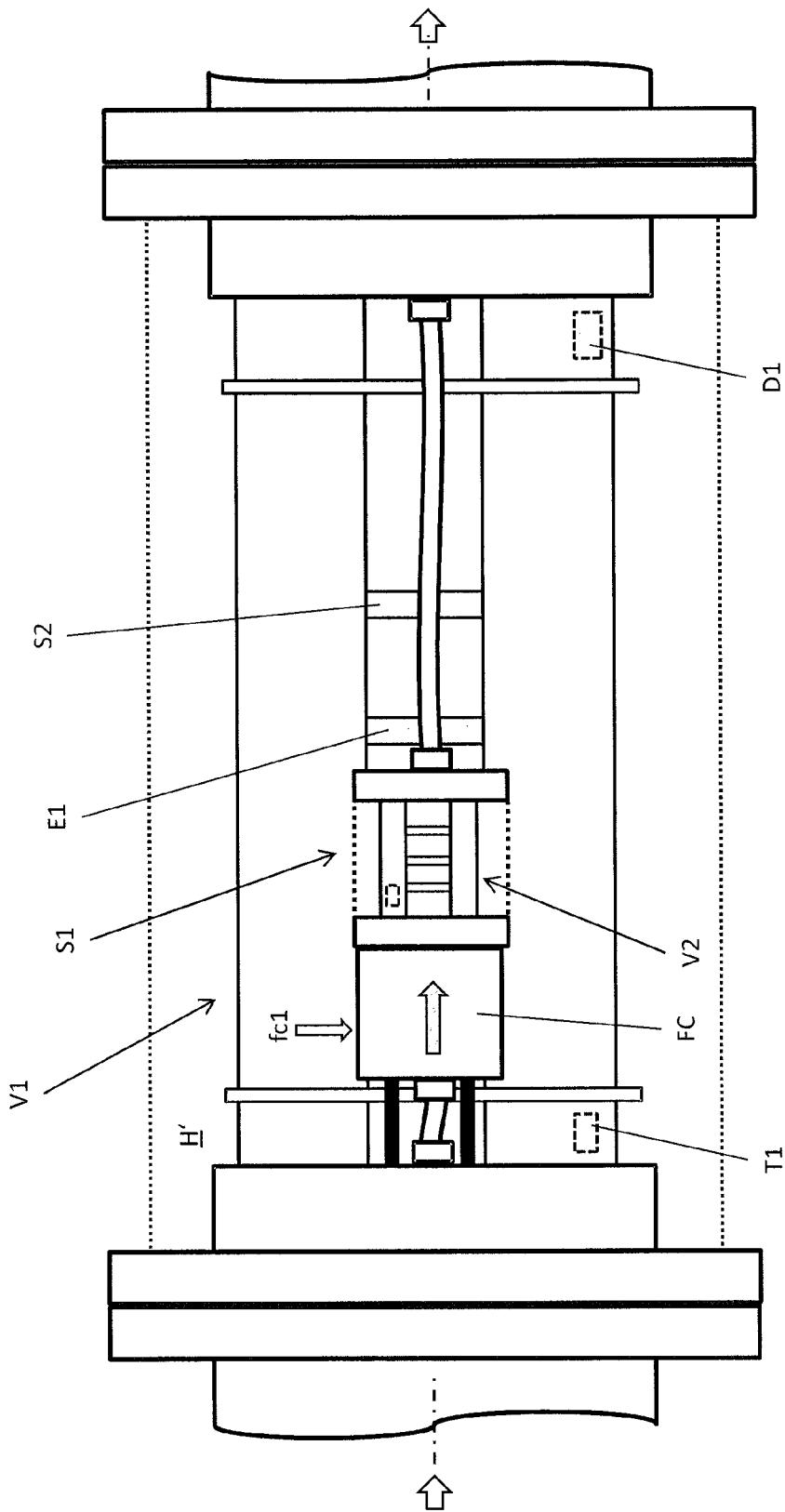
FIGS. 4 and 5 are schematic views of other variants of embodiments for a measuring system according to FIG. 1 with, again, two vibration elements accommodated within one and the same housing, and flowed-through, in each case, by medium, at least at times, during operation of the measuring system.
Figure 5:
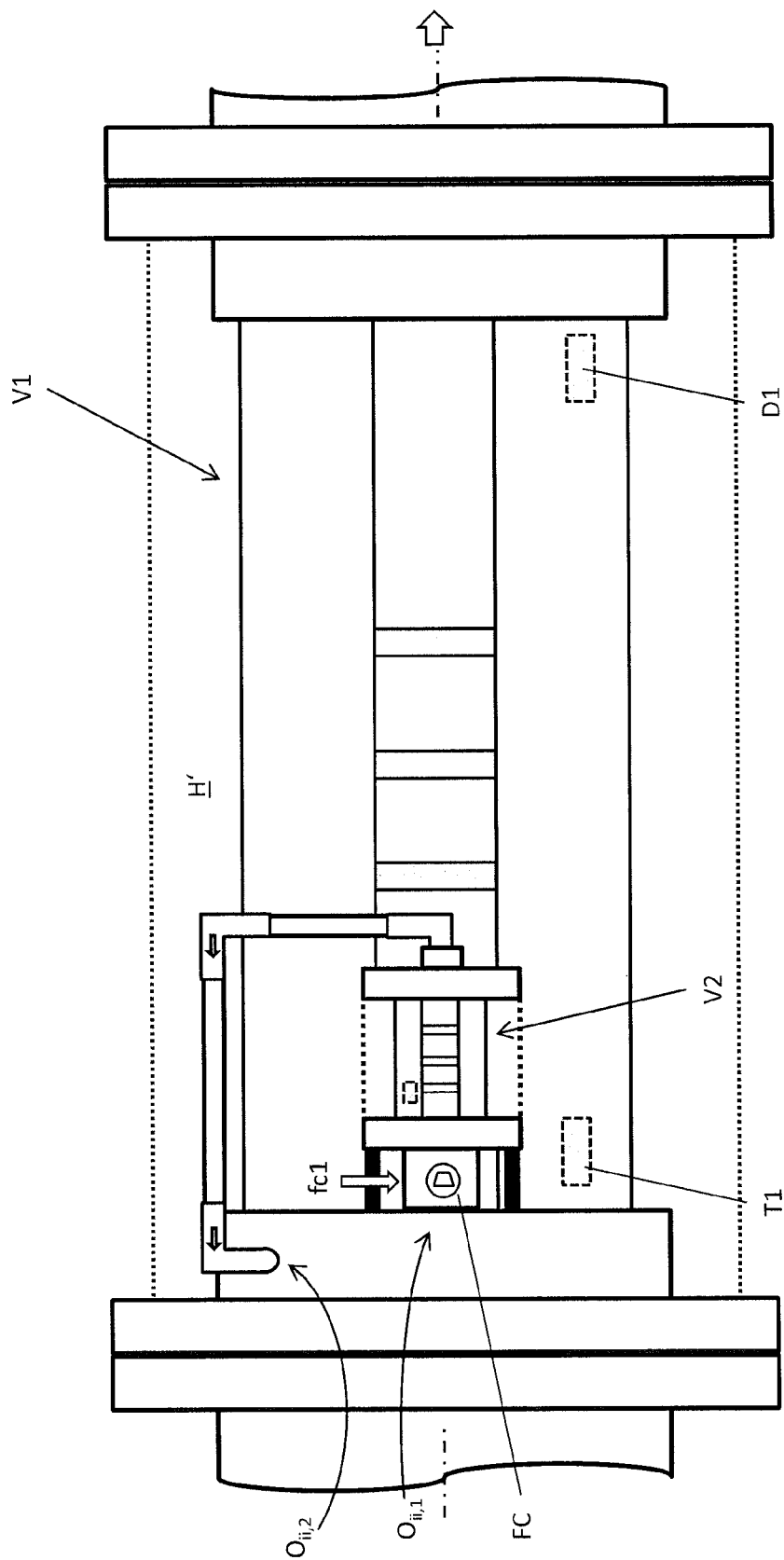

In an additional embodiment of the invention, such as, among other things, indicated in FIGS. 3 and 4, and 5, also the second vibration element V2 includes a lumen for guiding flowing medium, wherein the vibration element V2, in turn, is so connectable to the pipeline so that its lumen communicates at least temporarily with a lumen of the pipeline. Accordingly, also the second vibration element V2 can be formed by means of at least one measuring tube 21 held oscillatably on the, respectively in the, housing H for communicating during operation of the measuring system at least temporarily with the pipeline. For the purpose of generating the mentioned resonant oscillations over a structurally predetermined, free oscillatory length, the second vibration element V2 is caused to vibrate at least temporarily, for example, also simultaneously with the vibration element V1. In an additional embodiment of the invention, it is, in such case, further provided that the measuring tube 11 has a free oscillatory length, which is greater than the free oscillatory length of the measuring tube 21. The at least one measuring tube 21 forming the vibration element V2 can be curved, for example, and, in such case, additionally also have a tube form used for such measuring tubes, for example, thus a circular arc shaped, trapezoid shaped, V shaped, U shaped, S shaped, Z shaped or helix-shaped silhouette. Moreover, the measuring tube 21 can be manufactured, for example, also from the same material as the at least one measuring tube 11 forming the vibration element V1, respectively also of another material usual for such vibration elements, for example, thus a metal tube manufactured from stainless steel or also from a titanium, a tantalum and/or a zirconium alloy. Serving as active excited resonant oscillations can be accordingly—analogously as in the case of the vibration element V1—likewise oscillations of a natural eigenmode of the vibration element V2, in the case of which the at least one measuring tube 21 at least partially executes bending oscillations about an imaginary oscillation axis imaginarily connecting its two tube ends. Especially, the measuring and operating electronics is, in such case, adapted to excite the driver signal e2 with a mode of the vibration element V2 fundamental for the instantaneous resonant frequency of the bending oscillation, thus that eigenmode, in which the measuring tube 21 forming the vibration element V2 executes bending oscillations, which have only a single oscillatory antinode over the entire free oscillatory length.

In an additional embodiment of the invention, the vibration element V2 is, as shown schematically in FIGS. 2a, 2b, 3, formed not by means of only a single measuring tube 21, but, instead, by means of at least two equally constructed, mutually at least sectionally parallel, measuring tubes 21, 22, for example, also connected by means of flow dividers to create parallel flow. This, especially, also in such a manner that the vibration element V2, as indicated in FIG. 2a, respectively 2b, is formed by means of at least two curved measuring tubes 21, 22, which in order to form as equally as possible long, free oscillatory lengths, are mutually mechanically coupled only pointwise, for example, again, by means of node plates affixed at the end regions of the measuring tubes. The second vibration element V2 can, in such case, accordingly also be so embodied that it corresponds, for example, to one of the vibration elements shown in the above mentioned CN-A 10 18 58 765, U.S. Pat. No. 5,796,011, U.S. Pat. No. 6,711,958 or WO-A 00/57141. Serving as second vibration element V2, not least of all for the case, in which the measuring system is provided for applications with gaseous or also low viscosity media of less than 60 mPa·s can be, however, for example, also vibration elements (MEMS) manufactured in microsystem technology, such as shown, among other things, also in US-A 2010/0043569, U.S. Pat. No. 7,921,737, U.S. Pat. No. 7,823,445, U.S. Pat. No. 7,437,912, U.S. Pat. No. 6,477,901, respectively WO-A 2007/147786. Thus, the vibration element V2 can be formed by means of a measuring tube, which has a caliber of less than 0.5 mm. At the same time, the vibration element V1 can be formed, for example, by means of two or more measuring tubes, of which each has a caliber of greater than 40 mm.

As directly evident from a combination of FIGS. 1 and 2a, 2b, 3, 4, 5, 6, 7a, 7b, in advantageous manner, both the first as well as also the second vibration element V1, V2 can also be accommodated within one and the same lumen of the housing H, namely within the lumen H'. Furthermore, the two vibration elements V1, V2 are preferably so dimensioned as regards their installed dimensions that the vibration element V2 is smaller than the vibration element V1, both as regards an installed length (z-direction), depending, in the case of forming the vibration element V2 by means of at least one measuring tube, on the selected oscillatory length, as well as also an installed height (y-direction), as well as also an installed breadth (x-direction), consequently in all three spatial directions, x, y, z. This, especially, also in such a manner that the two vibration elements V1, V2 can also be accommodated within a housing used previously for conventional measuring systems, for example, applied as Coriolis mass flow measuring devices, having only one vibration element corresponding, namely, to the vibration element V1. For such purpose, the at least one measuring tube 11, respectively each of the measuring tubes, by means of which the vibration element V1 is formed, has, according to an additional embodiment of the invention, a caliber (DN11), which is greater than the caliber (DN21) of the at least one measuring tube 21, respectively each of the measuring tubes, by means of which the vibration element V2 is formed. This, especially, in such a manner that the mentioned caliber of the measuring tube 11 amounts to more than 5-times the caliber of the measuring tube 21 (DN11>5 DN21), especially also greater than 10-times the caliber of the measuring tube 21 (DN11>10·DN21).

The second vibration element V2 is in the case of the examples of embodiments shown in FIGS. 1 to 7b, furthermore, adapted, to guide in its lumen, at least at times, in each case, a part of the medium flowing with a second mass flow rate $m_2$ and, while that is happening, to be caused to vibrate, especially with the resonant frequency $f_{r2}$. This, especially, also in such a manner that the two vibration elements V1, V2 are, at least at times, simultaneously flowed through by medium. Considering that, on the one hand, the vibration element V2 mainly serves to deliver the oscillatory signal s3 with a signal frequency corresponding to the resonant frequency $f_{r2}$ of the vibration element V2, consequently correlated with the density of the medium, while, on the other hand, the density, not least of all also in comparison to mass flow rate $m_1$, most often changes only slowly, it is in the case of the measuring system of the invention, furthermore, directly possible, so to construct the two vibration elements V1, V2, that the mass flow rate $m_2$, with which the part of the medium guided in the lumen of the vibration element V2 flows, is less than the mass flow rate $m_1$, with which the part of the medium guided in the lumen of the vibration element V1 flows; this, especially, in such a manner that a maximum possible, respectively allowable, mass flow rate in the vibration element V1 corresponds to greater than 10-times, especially also greater than 100-times, a maximum possible, respectively allowable, mass flow rate in the vibration element V2. Therefore, according to an additional embodiment of the invention, the first and second vibration elements V1, V2, respectively their respective lumens, are, furthermore, so dimensioned that the vibration element V1 has a flow cross section, which is greater than the flow cross section of the vibration element V2, respectively that the vibration element V2 has a flow resistance, which is greater than the flow resistance of the vibration element V1. For the above mentioned case, in which the two vibration elements V1, V2 are accommodated within a single housing, it can additionally be advantageous so to embody the vibration element V2 that its flow resistance is as large as possible, respectively its flow cross section is as small as possible, namely so to embody the vibration element V2 that, in the case of a measuring system specific, minimum value predetermined for the mass flow rate $m_1$ and a measuring system specific, maximum value predetermined for the viscosity of the medium, the mass flow rate $m_2$ just exactly still achieves a predetermined, measuring system specific, minimum value corresponding, for example, to less than 10% of the measuring system specific, maximum value predetermined for the mass flow rate $m_1$. As a result of this, thus, also such a vibration element V2 can be used, whose installed dimensions are best suited for the installation space still remaining in the housing besides the vibration element V1, respectively, from a number of structures potentially possible for the vibration element V2, such a one can easily be selected, which, for reaching an as good as possible correlation between density to be measured and the signal frequency of the oscillatory signal s3 representing such, consequently for reaching an as high as possible accuracy in the case of density measurement, best utilizes the installation space in the housing.

In an additional embodiment of the invention, the vibration element V2 is, such as schematically indicated in FIG. 3, respectively 4, furthermore, adapted to be inserted into the course of the pipeline and so connected to its line segments L11, L12 that the lumen of the vibration element V2 communicates with the respective lumen of each of the two line segments L11, L12 of the pipeline and, thus, there is formed parallel to the at least one flow path formed by means of the first vibration element V1 a flow path enabling fluid flow from the line segment L11, then through the vibration element V2 and out to the line segment L12. Consequently, the vibration element V2, respectively its lumen, represents a bypass of the lumen of the vibration element V1.

Particularly for this case, in which the vibration element V2 is connected for flow in parallel with the vibration element V1, it can additionally be advantageous, during operation of the measuring system, also to ascertain the mass flow rate $m_2$, for example, when the mass flow rate $m_2$ over a longer period of time of greater than 10 s (second) assumes values, which correspond in time average to greater than 0.5% of the mass flow rate $m_1$, and/or when a neglecting of the mass flow rate $m_2$ in the case of calculating the volume flow rate, respectively the volume flow, alone based on the mass flow rate $m_1$ would lead to measuring errors no longer tolerable in the case of the ascertaining the measured values $X_v$, respectively measured values $X_V$. Therefore, the measuring system, according to an additional embodiment of the invention, further comprises at least a fourth oscillation sensor S4 spaced from the third oscillation sensor S3 for registering vibrations of the second vibration element. Said oscillation sensor S4 is, in such case, adapted likewise to generate a fourth oscillatory signal s4 dependent on vibrations of the second vibration element V2, in such a manner that the oscillatory signal s4 has a signal frequency equal the signal frequency of the oscillation signal s3, consequently likewise corresponding to the second resonant frequency $f_{r2}$, as well as relative to the third oscillatory signal s3 a phase difference $\Delta_{\varphi r34}$ dependent on the mass flow rate $m_2$. Furthermore, the measuring and operating electronics is, in such case, also adapted to generate measured values $X_v$, respectively measured values $X_V$, also by means of the oscillation signal s4, namely based on the phase difference $\Delta_{\varphi 34}$, respectively based on a recurringly ascertained, second phase measured value $X_{\Delta\varphi 34}$ instantaneously representing the phase difference $\Delta_{\varphi 34}$. This, for example, in such a manner that the already mentioned formula (3) for calculating the measured value $X_v$, respectively the measured value $X_V$, is modified as follows:

$$\frac{X_m}{X_\rho} = \frac{b_{10} + b_{11} \cdot \dfrac{X_{\Delta\varphi 12}}{X_{fr1}} + b_{20} + b_{21} \cdot \dfrac{X_{\Delta\varphi 34}}{X_{fr2}}}{a_{20} + a_{21} \cdot \dfrac{1}{X_{fr2}^2}} \qquad (4)$$

The therein contained coefficients $b_{20}$, $b_{21}$ are, again, measuring system specific, namely fixed by the concrete mechanical construction of the vibration element V2, and can be ascertained likewise by means of a corresponding (wet-) calibration of the measuring system, for example, even simultaneously with the calibration performed in any event for ascertaining the other coefficients $a_{20}$, $a_{21}$, respectively $b_{10}$, $b_{11}$. Accordingly, then also the mass flow measured value $X_m$ for the mass flow rate reigning in the measuring system, respectively a corresponding (total-) mass flow for the mentioned measuring interval, can be calculated still more exactly taking into consideration the aforementioned formula (4) based on following formula:

$$X_m = b_{10} + b_{11} \cdot \frac{X_{\Delta\varphi 12}}{X_{fr1}} + b_{20} + b_{21} \cdot \frac{X_{\Delta\varphi 34}}{X_{fr2}} \quad (5)$$

Alternatively or supplementally, also the two mass flow rates $m_1$, $m_2$ can be ascertained individually, e.g. in the following manner:

$$X_{m1} = b_{10} + b_{11} \cdot \frac{X_{\Delta\varphi 12}}{X_{fr1}}, \quad (6)$$

$$X_{m2} = b_{20} + b_{21} \cdot \frac{X_{\Delta\varphi 34}}{X_{fr2}}$$

and output by means of corresponding measured values $X_{m1}$, respectively $X_{m2}$, for example, also displayed on-site.

Alternatively to the above described variant, in the case of which the vibration element V2 is connected as a bypass of the vibration element V1, the vibration element V2 can, such as schematically indicated in FIG. 5, however, also be so connected with the pipeline that the mass flow rate of the medium flowing from the line segment L11 to the line segment L12 is essentially not changed by the flow path formed by means of the vibration element V2, consequently, at least in the case of stationary flow, the first mass flow rate $m_1$ essentially equals an instantaneous mass flow rate of the medium in the line segment L11, as well as also in the line segment L12, respectively the phase difference $\Delta_{\varphi 12}$ essentially corresponds to the mass flow rate of the medium in the line segments L11, L12. For connecting the vibration element V2 to the pipeline, not least of all also for the purpose of providing the aforementioned flow path, according to an additional embodiment of the invention, the housing end H1 includes at least one flow opening $O_{ii,1}$ of second type, namely a flow opening communicating with the vibration element V2. This can be arranged, for example, centrally of the housing end H1 or, however, also, such as shown in FIG. 2a, eccentrically in the housing end H1, especially with a separation from the center of the housing end H1 corresponding to, for instance, 0.2- to 0.3-times the nominal diameter of the measuring system. Furthermore, in such case, either the housing end H2 includes, such as directly evident from the combination of FIGS. 2a and 2b, 3, 4, 7a, respectively 7b, at least one flow opening $O_{ii,1}$ of second type, namely a flow opening communicating with the vibration element V2, or, however, one of the two housing ends (in the example of an embodiment shown in FIG. 5 namely the housing end H1) includes two flow openings $O_{ii,1}$, $O_{ii,2}$ of second type spaced from one another. On the other hand, the at least one measuring tube 21, by means of which the vibration element V2 is formed, includes accordingly, in each case, a first tube end communicating with the flow opening $O_{ii,1}$ of second type as well as a second tube end communicating with the flow opening $O_{ii,2}$ of second type.

Particularly for the purpose of preventing disturbing influences potentially affecting its oscillations, respectively its sensor signal S3 and/or for the purpose of an as good as possible exploitation of the totally offered space for installation, it can be of advantage to connect the vibration element V2 not directly at the two flow openings $O_{ii,1}$, $O_{ii,2}$ of second type, but, instead, such as shown schematically in FIGS. 3 and 4, respectively 5, by means of at least one interposed, for example, flexible and/or bent, flow connection line. In an additional embodiment of the invention, consequently, the vibration element V2 is, furthermore, connected to the first flow opening $O_{ii,1}$ of second type by means of at least one, for example, flexible and/or bent, first connection line L21. Moreover, the vibration element V2 can additionally also be connected by means of a, for example, flexible and/or bent, second connection line L22 to the second flow opening $O_{ii,2}$ of second type, this, for example, also such that the vibration element V2 connected to the pipeline via connecting lines L21, L22 is placed within the housing H removed from both housing ends H1, H2.

In an additional embodiment of the invention, the measuring system further comprises a first temperature sensor T1 electrically connected to the measuring and operating electronics ME for registering a temperature 41 of the vibration element V1 and serving, together with the measuring and operating electronics, to generate a first temperature signal $\theta 1$ dependent on the temperature $\partial 1$ of the vibration element V1, as well as a second temperature sensor T2 likewise electrically connected to the measuring and operating electronics for registering a temperature 42 of the vibration element V2 and adapted, together with the measuring and operating electronics, to generate a second temperature signal $\theta 2$ dependent on the temperature $\partial 2$ of the vibration element V2. The two temperature signals $\theta 1$, $\theta 2$ are then further processed and evaluated by means of the measuring and operating electronics. The temperature sensor T1 can, for example, such as quite usual in the case of vibration elements of the type being discussed, be arranged in the measuring system contacting the vibration element V1, for instance, on a side, respectively surface, of the vibration element V1 facing away from the lumen of the vibration element V1, consequently not contacted by the medium. Equally, also the second temperature sensor T2 can be arranged in the measuring system contacting the vibration element V2, for example, thus also on a surface of the vibration element V2 not contacted by medium. Serving as temperature sensor T1, respectively T2, can be, for example, in each case, a platinum resistance element applied on the particular vibration element, in given cases, also with inter-positioning of a ply of a corresponding substrate, in order to form a resistance thermometer, for instance, a Pt100 resistance thermometer or a Pt1000 resistance thermometer, which is electrically connected with the measuring and operating electronics, for example, in each case, by means of an additional pair of connection wires (not shown). The measuring and operating electronics is, in such case, furthermore, adapted also to process and to evaluate the temperature signals $\theta 1$, $\theta 2$ in such a manner that measured values representing the volume flow rate $\dot{v}$, respectively the volume flow v, are generated by means of the first temperature signal $\theta 1$ and/or by means of the second temperature signal $\theta 2$. Consequently the temperature $\partial 1$ of the vibration element V1 registered by means of the temperature sensor T1, respectively the temperature $\theta 2$ of the vibration element V2 registered by means of the temperature sensor T2, are individually taken into consideration in ascertaining the volume flow rate $\dot{v}$, respectively the volume flow v. For example, the accuracy, with which the measured value $X_\rho$ representing the density $\rho$ of the medium guided in the vibration element V2 agrees with the density ρ, can be very simply further improved by, for example, modifying the above formula (1) for ascertaining the measured value $X_\rho$ by taking into consideration a temperature measured value $X_{\partial 2}$ won from the temperature signal $\theta_2$ by means by the measuring and operating electronics and instantaneously representing the temperature $\partial_2$ as well as an additional measuring system specific, coefficient $a_{23}$, for example, ascertained in the course of the already mentioned (wet-) calibration of the measuring system, to yield a modified formula as follows:

$$X_\rho = a_{20} + a_{21} \cdot \frac{1}{X_{fr2}^2} + a_{23} \cdot \frac{X_{\vartheta 2}}{X_{fr2}^2}, \quad (7)$$

whereby the influence of the temperature $\partial 2$ on the resonant frequency $f_{r2}$ of the vibration element V2 is at least partially compensated. Equally, based on the temperature signal $\theta_1$, additionally also the accuracy, with which measured values $X_m$ representing the mass flow are ascertained, can be further improved, consequently the influence of the temperature $\partial 1$ on the phase difference $\Delta_{\varphi 12}$ at least partially compensated, by also modifying the above mentioned formula (2) for ascertaining the measured value $X_m$ by incorporating a temperature measured value $X_{\partial 1}$ won from the temperature signal $\theta_1$ by means of the measuring and operating electronics and instantaneously representing the temperature $\partial_1$ as well as an additional, measuring system specific coefficient $b_{13}$, for example, likewise ascertained in the course the already mentioned (wet-) calibration of the measuring system, to yield the following modified formula:

$$X_m = b_{10} + \frac{b_{11}}{1 + b_{13} \cdot X_{\vartheta 1}} \cdot \frac{X_{\Delta\varphi 12}}{X_{fr1}}. \quad (8)$$

Respectively, by taking into consideration both temperature signals $\theta_1$, $\theta_2$, the influence of the temperature $\partial 1$ on the phase difference $\Delta_{\varphi 12}$, respectively the influence of the temperature $\partial 2$ on the phase difference $\Delta_{\varphi 34}$, can at least partially be compensated by modifying the formula (5) with incorporation of two measuring system specific, coefficients $b_{13}$, $b_{23}$ as follows:

$$X_m = b_{10} + \frac{b_{11}}{1 + b_{13} \cdot X_{\vartheta 1}} \cdot \frac{X_{\Delta\varphi 12}}{X_{fr1}} + b_{20} + \frac{b_{21}}{1 + b_{23} \cdot X_{\vartheta 2}} \cdot \frac{X_{\Delta\varphi 34}}{X_{fr2}}. \quad (9)$$

Based on the aforementioned formula (7) for the improved, namely temperature compensated, calculating of the density measured value $X_\rho$ as well as the formula (8), respectively (9), accordingly also the influences of the temperatures $\partial_1$, $\partial_2$ on the accuracy of the measuring of the volume flow rate, respectively volume flow in the case of ascertaining the measured values $X_v$, respectively the measured values $X_V$, can be correspondingly taken into consideration, respectively compensated, for example, by one of the following modifications of the above formula (3):

$$\frac{X_m}{X_\rho} = \frac{b_{10} + \frac{b_{11}}{1 + b_{13} \cdot X_{\vartheta 1}} \cdot \frac{X_{\Delta\varphi 12}}{X_{fr1}}}{a_{20} + a_{21} \cdot \frac{1}{X_{fr2}^2} + a_{23} \cdot \frac{X_{\vartheta 2}}{X_{fr2}^2}}, \text{ respectively} \quad (10)$$

$$\frac{X_m}{X_\rho} = \frac{b_{10} + \frac{b_{11}}{1 + b_{13} \cdot X_{\vartheta 1}} \cdot \frac{X_{\Delta\varphi 12}}{X_{fr1}} + b_{20} + \frac{b_{21}}{1 + b_{23} \cdot X_{\vartheta 2}} \cdot \frac{X_{\Delta\varphi 34}}{X_{fr2}}}{a_{20} + a_{21} \cdot \frac{1}{X_{fr2}^2} + a_{23} \cdot \frac{X_{\vartheta 2}}{X_{fr2}^2}},$$

so that thus, as a result, thereafter, also the volume flow rates, respectively volume flow, measured values have no or only negligibly small dependencies on the temperatures $\partial_1$, $\partial_2$. Moreover, based on the two temperature signals θ1, θ2, respectively the therefrom derived temperature measured values $X_{\partial 1}$, $X_{\partial 2}$, also in the case of mutually differing temperatures $\partial 1$, $\partial 2$, for instance, as a result of an abruptly changing, respectively broadly fluctuating, temperature of the medium flowing via line segment L11 into the measuring system and, associated therewith, a transient temperature distribution within the measuring system, respectively a temperature gradient resulting therefrom between the two vibration elements V1, V2, dependent on the instantaneous density of the medium instantaneously contacting the vibration element V2, as well as also on an instantaneous temperature $\partial 2$ of the vibration element V2, the resonant frequency of the vibration element V2 measured based on the oscillation signal s3 can be converted into an assumed resonant frequency $f_{r2}'$ of the vibration element V2 corresponding to an instantaneous temperature 41 of the vibration element V1, respectively based on the oscillatory signal s3 and the temperature signal θ2 for the medium instantaneously contacting the vibration element V2, a firstly ascertained, provisional density measured value $X_\rho'$ can be converted into the density measured value $X_\rho$ for the instantaneous density of the medium instantaneously guided in the vibration element V1 corresponding to the instantaneous temperature $\partial 1$ of the vibration element V1.

In an additional embodiment of the invention, the measuring system further comprises at least one deformation sensor D1 electrically connected to the measuring and operating electronics for registering an elastic deformation of the first vibration element V1, for example, a thermally related, elastic deformation and/or an elastic deformation effected by force introduced into the measuring system via the pipeline. The deformation sensor D1 is, in such case, especially adapted, together with the measuring and operating electronics, to generate a deformation signal d1 dependent on deformation of the vibration element V1 and to provide such to the measuring and operating electronics. The deformation sensor D1 can be formed, for example, by means of a strain gauge (SG) adhered to the vibration element V1, namely on a side facing away from its lumen and electrically connected with the measuring and operating electronics, for example, in each case, by means of an additional pair of connection wires (not shown). The deformation signal d1 generated by means of the deformation sensor D1 can be utilized by the measuring and operating electronics, for example, in order to correct influences of the aforementioned elastic deformations of the vibration element V1 on its oscillation characteristics, respectively, corruption associated therewith of, for instance, the phase difference $\Delta_{\varphi 12}$. Therefore, according to an additional embodiment of the invention, the measuring and operating electronics is adapted to generate the measured value representing the volume flow rate $X_v$ and/or the measured value representing the volume flow $X_V$ by means of the deformation signal, respectively to output such as a valid measured value X ($X_V \rightarrow X$, $X_v \rightarrow X$) of the measuring system. The deformation signal d1 can, however, alternatively or supplementally, also serve to detect, by means of the measuring and operating electronics, whether the vibration element V1 instantaneously has no elastic deformation of the aforementioned type, so that thus also its instantaneous resonant frequency $f_{r1}$ is well suited as an exact measure for the density of the medium. Consequently, measured values representing the volume flow rate $X_v$, respectively measured values representing the volume flow $X_V$, instantaneously also ascertained based on the signal frequency of the first and/or second oscillation signal, can be issued as valid measured values X of the measuring system. Another possibility is that the vibration element V1 is deformed in such a high measure that its resonant frequency $f_{r1}$ is instantaneously insufficient to serve as an exact measure for the instantaneous density of the medium, so that measured values representing the volume flow rate $X_v$, respectively measured values representing the volume flow $X_V$, would best be ascertained based on the signal frequency of the third oscillatory signal s3.

The measuring system of the invention can, furthermore, also have at least two different operating modes, for example, operating modes selectively activatable by means of the aforementioned deformation signal d1, for ascertaining the volume flow rate, respectively the volume flow, of the medium flowing in the pipeline, namely a first operating mode, in which the measuring and operating electronics ascertains the measured values $X_V$($X_V \rightarrow X$), respectively $X_v$ ($X_v \rightarrow X$), serving as valid measured values X of the measuring system based both on the phase difference $\Delta_{\phi 12}$ as well as also on the signal frequency of the third oscillation signal s3 corresponding to the resonant frequency $f_{r2}$ of the vibration element V2, and an alternative second operating mode, in which the measuring and operating electronics ascertains the measured values $X_V$, respectively $X_v$, serving as valid measured values X of the measuring system based both on the phase difference 412 as well as also on the signal frequency of the first and/or second oscillation signal corresponding to the resonant frequency $f_{r1}$ of the vibration element V1, not, however, based on the resonant frequency $f_{r2}$ of the vibration element V2, respectively the signal frequency of the oscillation signal s3 corresponding to such. The measuring and operating electronics can, in such case, furthermore, also be so adapted that in the second operating mode of the measuring system it does not deliver the driver signal e2 serving for exciting the vibration element V2, respectively delivers such only in the first operating mode of the measuring system, consequently the vibration element V2 is not caused to vibrate in the second operating mode, respectively only in the first operating mode is it caused to vibrate. The activating of the first, respectively second operating mode can, in turn, occur, for example, in each case, based on the deformation signal d1, for instance, by means of a comparison executed recurringly in the measuring and operating electronics of an (instantaneous) amplitude of the deformation signal d1 with a measuring system specific, first deformation reference value serving as switching threshold for deactivating the first and activating the second operating mode and representing a predetermined first degree of deformation at least of the vibration element V1, respectively by means of a comparison executed recurringly in the measuring and operating electronics of the aforementioned amplitude of the deformation signal d1 with a measuring system specific, second deformation reference value serving as switching threshold for deactivating the second and activating the first operating mode and representing a predetermined second, degree of deformation of vibration element V1 namely smaller in comparison to the first degree of deformation. Alternatively or supplementally, the activating of the first and/or second operating mode can occur, in each case, with application also of the first temperature signal θ1, for example, in such a manner that there is executed in the measuring and operating electronics recurringly a comparison of an (instantaneous) amplitude of the temperature signal θ1 with a measuring system specific, first temperature reference value serving as switching threshold for deactivating the first and activating the second operating mode and representing a first thermal stress predetermined for the vibration element V1, respectively there is executed in the measuring and operating electronics recurringly a comparison of the aforementioned amplitude of the temperature signal θ1 with a measuring system specific, second temperature reference value serving as switching threshold for deactivating the second and activating the first operating mode and representing a predetermined second thermal stress in the vibration element V1, namely one smaller in comparison with the first thermal stress. For the case, in which the activating of the first operating mode occurs based both on the deformation signal d1 as well as also on the temperature signal θ1, the measuring and operating electronics is in advantageous manner so adapted that the first operating mode is also already activated when a reaching, respectively exceeding, of only the first deformation reference value by the deformation signal d1 or also of only the first temperature reference value by the temperature signal θ1 is detected. Conversely, for the case, in which the activating of the second operating mode occurs based both on the deformation signal d1 as well as also on the temperature signal θ1, the measuring and operating electronics is in advantageous manner so adapted that said second operating mode is only activated when a reaching, respectively subceeding, of both the second deformation reference value by the deformation signal d1 and also the second temperature reference value by the temperature signal θ1 are detected. In supplementation of the prescribed selective activating/deactivating of the first, respectively second, operating modes based on the temperature signal θ1, it can, furthermore, not least of all for reaching a high accuracy of measurement also in the case of ascertaining the volume flow rate, respectively the volume flow, at relatively high flow velocities, namely velocities lying above a measuring system specific, critical flow velocity, for example, amounting to 8 m/s (meters per second) or more, be quite advantageous also to change from the second into the first operating mode, consequently also to activate the first operating mode, when a phase difference to signal frequency ratio, namely a ratio of the instantaneously measured phase difference $\Delta_{\phi 12}$ to the signal frequency corresponding to the instantaneous resonant frequency $f_{r1}$, as measured at at least one of the sensor signals s1, s2, reaches or exceeds a predetermined reference value representing the measuring system specific, critical flow velocity.

In an additional embodiment, the measuring system includes, furthermore, a third operating mode, in which the measuring and operating electronics ascertains the measured values $X_V$($X_V \rightarrow X$), respectively $X_v$($X_v \rightarrow X$), serving as valid measured values X of the measuring system, indeed, based both on the phase difference $\Delta_{\phi 12}$ as well as also on the signal frequency of at least one of the oscillation signals s1, s2 corresponding to the resonant frequency $f_{r1}$ of the vibration element V1, but, in contrast with the above-described second operating mode, simultaneously also the vibration element V2 is contacted by the medium and, while that is happening, is excited by means of the driver signal e2 likewise generated at least at times by the measuring and operating electronics in the third operating mode correspondingly actively to resonant oscillations. The measuring and operating electronics is, in such case, furthermore, adapted, based both on the signal frequency of at least one of the oscillation signals s1, s2 received during the third operating mode and corresponding to the resonant frequency $f_{r1}$ as well as also based on the signal frequency at least of the signal s3 received during the third operating mode oscillation and corresponding to the resonant frequency $f_{r2}$, to perform a (self-) checking of the measuring system, especially such concerning whether the measuring system is still working within the predetermined specification, and/or whether the measured values X output by the measuring system can be viewed as valid. The checking of the measuring system can be performed e.g., by ascertaining by means of the measuring and operating electronics recurringly a relative or absolute deviation of the two resonance frequencies $f_{r1}$, $f_{r2}$ from one another, and thereafter comparing with a correspondingly predetermined limit value, which represents a maximum allowable, respectively for an intact measuring system maximum expected, deviation of the two resonance frequencies $f_{r1}$, $f_{r2}$ from one another. For the case, in which the deviation reaches or exceeds the aforementioned limit value, the measuring and operating electronics can, furthermore, generate an alarm, for example, which signals that serious damage to at least one of the two vibration elements V1, V2, for instance, as a result of abrasion, corrosion, plastic deformation or crack formation, has been detected. Alternatively or supplementally, the measuring and operating electronics is, furthermore, adapted to perform the aforementioned checking of the measuring system based on the driver signals e1, e2, generated during the third operating mode, for example, in such a manner that the measuring and operating electronics during the third operating mode for each of the two driver signals e1, e2, in each case, ascertains an average electrical power, namely an average electrical power $P_{exc1}$ of the driver signal e1, and an average electrical power $P_{exc2}$ of the driver signal e2, and compares a—relative or absolute—deviation of the two electrical powers $P_{exc1}$, $P_{exc2}$ from one another with a corresponding, predetermined limit value. Also, in such case, the limit value can be so set that a reaching or exceeding of the same indicates an, in given cases, to be alarmed, significant damage of at least one of the two vibration elements V1, V2. Alternatively or supplementally to the described checking of the measuring system by means of the oscillation- and/or driver signals generated in the third operating mode, additionally also the two mentioned temperature signals θ1, θ2 can be used for checking the measuring system, for example, in such a manner that for the case, in which the two vibration elements V1, V2 are nominally contacted by the same medium, respectively would have to be contacted by the same medium, in the case of an unallowably high and/or unallowably long lasting deviation of the two temperatures ∂1, ∂2 from one another ascertained based on the two temperature signals θ1, θ2, the measuring and operating electronics generates an alarm, which signals the forming of a deposit on at least one of the two vibration elements V1, V2, and/or an alarm is generated, which signals that at least one of the measuring tubes forming the vibration element V1 or the vibration element V2 is at least partially plugged.

For controlling the flow through the vibration element V2, respectively the mass flow rate $m_2$, in given cases, also for the purpose of a temporary preventing of any flow through the vibration element V2 and/or for the purpose of the controlled transporting of the volume portion flowing through vibration element V2, for example, in the case of a high viscosity medium of greater than 100 mPa·s (millipascal second) and/or a, at times, relatively low mass flow rate $m_1$ of less than 50% of a measuring system specific, maximum value predetermined for the mass flow rate $m_1$ and/or, for example, also in order to be able to keep the flow cross section of the vibration element V2, consequently its installed dimensions, as small as possible, especially also sufficiently small that, as a result, the two vibration elements V1, V2 are suitable in a housing otherwise usually used also in conventional measuring systems with only a single vibration element, and/or for limiting the mass flow rate $m_2$ to a predetermined maximum value, for example, also in the case of high mass flow rates $m_1$ of greater than 80% of the predetermined measuring system specific, maximum value, the measuring system further comprises, according to an additional embodiment, a fluid control system FC connected, on the one hand, to one of the flow openings $O_{ii,1}$, $O_{ii,2}$ of second type and, on the other hand, to the vibration element V2, and having for example, an electromagnetically actuatable valve and/or an electric motor operated pump. The fluid control system FC can be formed, for example, by means of separate components arranged, in given cases, distributed within the housing and connected together by means of corresponding fluid, respectively electrical, connecting lines, or embodied, for example, as a flow controller joining all individual components in a module. In an additional embodiment of the invention, the fluid control system is connected via one of the connecting lines L21, L22 for flow through one of the flow openings $O_{ii,1}$, $O_{ii,2}$ of second type and/or the fluid control system is connected to the vibration element V2 for flow through one of the connecting lines L21, L22. The fluid control system FC, respectively the therein contained valves and/or pumps, can additionally be electrically connected with the measuring and operating electronics, for example, by means of connection wires. The measuring and operating electronics directly operates the fluid control system FC during operation of the measuring system by means of corresponding electrical control signals fc1 and supplies it with electrical energy. Alternatively or supplementally, the fluid control system FC can have its own internal control electronics, which includes its own energy supply circuit fed by the measuring and operating electronics, and which is started, respectively stopped and/or parametered, by the measuring and operating electronics by means of corresponding control commands transmitted by a control signal fc1, for example, a binary control signal fc1. In an additional embodiment of the invention, the fluid control system is or the measuring and operating electronics and fluid control system FC together are, adapted to allow the volume portion flowing through the vibration element V2 to flow with a predeterminable volume flow rate, respectively to control the volume flow rate to a predetermined constant value corresponding, for example, to a working point especially suitable for measuring the resonant frequency $f_{r2}$ of the vibration element V2. This basically enables, on the one hand, minimizing possible inaccuracies in the case of balancing the two mass flow rates $m_1$, $m_2$ and, on the other hand, therewith very simply, a mass flow rate $m_2$ of the volume portion flowing through vibration element V2 for ascertaining highly accurate measured value $X_v$ and/or measured value $X_V$, consequently for measuring the volume flow rate, respectively the volume flow, especially suitably independently of the other process parameters, such as, for instance, viscosity, temperature, pressure and/or mass flow rate of the medium flowing in the pipeline can be set, respectively correspondingly matched to said process parameters. Alternatively thereto or in supplementation thereof, for the above described case, in which the measuring system has at least two operating modes for ascertaining the volume flow rate, respectively the volume flow, of the medium flowing in the pipeline, the fluid control system FC can be deactivated during the said second operating mode by, for instance, turning a pump in the fluid control system off and/or closing a valve in the fluid control system, respectively the fluid control system FC is activated only during the first operating mode by turning a pump in the fluid control system on and/or at least partially opening a valve in the fluid control system.

Figure 9:
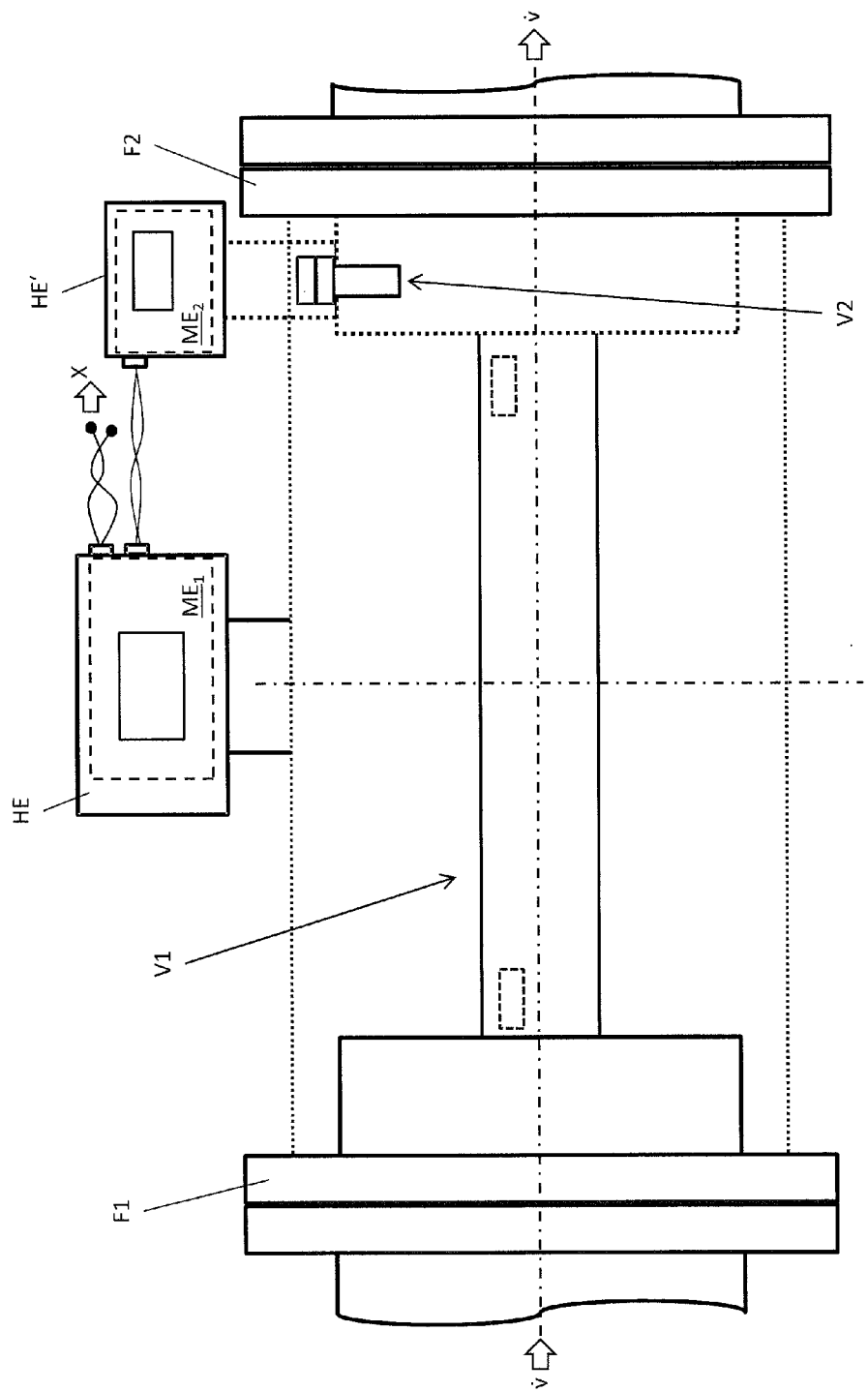
FIG. 9 is a schematic view of another variant of embodiment for a measuring system according to FIG. 1 with one vibration element accommodated within a housing and flowed-through by medium during operation of the measuring system and with an additional vibration element mounted externally on the housing and flowed on by medium during operation of the measuring system.

FIG. 9 shows schematically another embodiment for the measuring system of the invention. In the case of this measuring system, the second, vibration element V2 is, in contrast, for instance, to the embodiments shown in FIGS. 3 and 4 or 5, adapted, to be immersed in the medium, respectively flowed on by medium, and, while that is happening, again, namely same as in the case of the above-described variants of embodiments with flowed through vibration elements V2, to be caused to vibrate, actively excited by the oscillation exciter E2. For implementing this embodiment, the vibration element V2 can be, for example, a hollow body actively excited by means of the oscillation exciter to oscillations in a bell mode, for instance, according to EP-A 564 682. Furthermore, the vibration element V2 can, however, also be formed by means of at least one, for example, paddle shaped and/or internally hollow, oscillatory rod, which during operation is actively excited to bending oscillations. In accordance therewith, the vibration element V2 can, for example, also be formed by means of two mechanically attached, oscillatory rods and adapted, during operation, to be excited by means of the oscillation exciter E2 actively to execute resonant oscillations in the manner of a type of tuning fork. The vibration element V2 can thus also be a vibration element, such as shown, among other things, also in U.S. Pat. No. 6,845,663. Moreover, the vibration element V2 can also, such as shown schematically in FIG. 9, be a quite independently operable, vibronic (density-) measuring device. In accordance therewith, the vibration element V2 can thus, for example, also be a subcomponent of such a vibronic measuring device, such as the Liquiphant M FTL50 (http://www.us.endress.com/#product/FTL50) of the firm, Endress+Hauser GmbH & Co. KG, particularly also together with a density calculator FML621 (http://www.us.endress.com/#product/FML621). The vibration element V2 is in the case of the variant of embodiment shown in FIG. 9 held externally on the housing H, namely arranged outside of its lumen accommodating the vibration element V1, respectively on the outside of the housing H having here only one or more flow openings of first type and contacted by the medium during operation. The vibration element V2 can, in such case, be screwed-in by means of a screw in nozzle having a corresponding external thread into an installation opening inserted in the vicinity of one of the flanges F1, F2, and equipped with an internal thread complementary to the external thread. An advantage of the variant of embodiment shown in FIG. 9 is, among other things, that it needs as additional installation measure only the installation opening with internal thread. While this is, indeed, not necessarily present in conventional Coriolis mass flow measuring devices, it is directly, not least of all also suitably, and/or subsequently manufacturable for aforementioned vibronic (density-) measuring devices. Moreover, flow openings of second type can be omitted.

The invention claimed is:

1. A measuring system for ascertaining a volume flow, namely a total volume flowed during a measurement interval, and/or a volume flow rate of a medium, flowing in a pipeline, measuring system comprising:
  a first vibration element exhibiting a lumen, which first vibration element is adapted to guide in said lumen a part of the medium flowing with a first mass flow rate, and, while that is happening, to be caused to vibrate;
  at least a first oscillation exciter for exciting vibrations of said first vibration element in such a manner that said vibration element executes at least partially resonant oscillations, namely mechanical oscillations with a first resonant frequency;
  a first oscillation sensor for registering vibrations of said first vibration element, which first oscillation sensor is adapted to generate, dependent on vibrations of said first vibration element, a first oscillatory signal, which includes a signal frequency corresponding to said first resonant frequency;
  at least a second oscillation sensor spaced from said first oscillation sensor for registering vibrations of said first vibration element, which second oscillation sensor is adapted to generate a second oscillatory signal dependent on vibrations of said first vibration element in such a manner that said second oscillatory signal includes a signal frequency equal to the signal frequency of the signal component of said first oscillation signal, consequently corresponding to said first resonant frequency, as well as relative to said first oscillatory signal a phase difference, dependent on the first mass flow rate;
  a second vibration element, which second vibration element is adapted to be contacted, at least at times, by a part of the medium and, while that is happening, to be caused to vibrate;
  at least a second oscillation exciter for exciting vibrations of said second vibration element in such a manner that said second vibration element executes at least partially resonant oscillations, namely mechanical oscillations with a second resonant frequency, especially a second resonant frequency;
  at least a third oscillation sensor for registering vibrations of said second vibration element, which third oscillation sensor is adapted to generate, dependent on vibrations of said second vibration element, a third oscillatory signal, which includes a signal frequency corresponding to said second resonant frequency; and
  a measuring and operating electronics, wherein:
  said measuring and operating electronics is adapted to generate—by means of said first, second and third oscillation signals, namely based on the phase difference existing between said first and second oscillatory signal, and based on the signal frequency of said third oscillation signal—a measured value representing the volume flow rate, and/or
  said measuring and operating electronics is adapted to generate—by means of said first, second and third oscillation signals, namely based on the phase difference existing between said first and second oscillatory signals, and based on the signal frequency of said third oscillation signal—a measured value representing the volume flow.

2. The measuring system as claimed in claim 1, wherein:
said second vibration element is adapted to be immersed in medium, respectively to be flowed on by medium.

3. The measuring system as claimed in claim 1, wherein:
said first vibration element exhibits a flow cross section, which is greater than the flow cross section of said second vibration element; and/or
said second vibration element exhibits a flow resistance, which is greater than a flow resistance of said first vibration element; and/or
said second vibration element exhibits a lumen for guiding flowing medium and said second vibration element is adapted to guide in its lumen a part of the medium flowing with a second mass flow rate, and while that is happening, to be caused to vibrate.

4. The measuring system as claimed in claim 1, further comprising:
at least a fourth oscillation sensor spaced from said third oscillation sensor for registering vibrations of said second vibration element, wherein:
said fourth oscillation sensor is adapted to generate a fourth oscillatory signal dependent on vibrations of said second vibration element, in such a manner that said fourth oscillatory signal includes a signal frequency equal to the signal frequency of said third oscillation signal, consequently corresponding to said second resonant frequency, as well as relative to said third oscillatory signal a phase difference, dependent on said second mass flow rate.

5. The measuring system as claimed in claim 4, wherein:
said measuring and operating electronics is adapted to generate the measured value representing the volume flow rate also by means of the fourth oscillation signal, namely based on the phase difference, existing between the third and fourth oscillatory signals; and/or
said measuring and operating electronics is adapted to generate the measured value representing the volume flow, also by means of the fourth oscillation signal, namely based on the phase difference, existing between the third and fourth oscillatory signals; and/or
said measuring and said operating electronics is adapted, by means of the third and fourth oscillation signals, namely based on the phase difference existing between the third and fourth oscillatory signals, to generate a measured value representing the second mass flow rate, and/or
said measuring and operating electronics is adapted to generate, by means of the first and second oscillation signals, namely based on the phase difference, existing between the first oscillatory signal and the second oscillatory signal, a measured value representing the first mass flow rate.

6. The measuring system as claimed in claim 1, wherein:
said measuring and operating electronics is adapted to generate, by means of the third oscillation signal, namely based on the signal frequency of the third oscillation signal corresponding to the second resonant frequency a measured value representing a density of the medium.

7. The measuring system as claimed in claim 1, wherein:
said measuring and operating electronics is adapted to generate a first driver signal for said first oscillation exciter, which includes a signal frequency corresponding to the first resonant frequency.

8. The measuring system as claimed in claim 7, wherein:
said measuring and operating electronics is adapted, to generate a second driver signal for said second oscillation exciter, which includes a signal frequency corresponding to the second resonant frequency.

9. The measuring system as claimed in claim 8, wherein:
said measuring and operating electronics is adapted to generate the first and second driver signals simultaneously, in such a manner that the signal frequency of the second driver signal corresponding to the second resonant frequency, is less than the signal frequency of the first driver signal corresponding to the first resonant frequency.

10. The measuring system as claimed in claim 1, wherein:
said first vibration element is connectable to the pipeline, in such a manner that the lumen of said vibration element communicates with a lumen of the pipeline; and/or
said first and said second vibration elements are adapted to be flowed through simultaneously by medium.

11. The measuring system as claimed in claim 1, wherein:
said first vibration element is formed by means of at least one measuring tube; and/or
said second vibration element forms a bypass of the lumen of said first vibration element.

12. The measuring system as claimed in claim 1, wherein:
said second vibration element is formed by means of at least one measuring tube.

13. The measuring system as claimed in claim 11, wherein:
said at least one measuring tube, by means of which said first vibration element is formed, exhibits a caliber, which is greater than a caliber of said at least one measuring tube, by means of which said second vibration element is formed.

14. The measuring system as claimed in claim 12, wherein:
said second vibration element is connectable to the pipeline in such a manner that its lumen communicates with a lumen of the pipeline; and/or
said second vibration element is connectable to the pipeline by means of a first connection line, and by means of a second connection line.

15. The measuring system as claimed in claim 14, further comprising:
a fluid control system for control of the second mass flow rate.

16. The measuring system as claimed in claim 1, wherein:
the resonant frequency, with which said first vibration element is caused to vibrate, deviates from the resonant frequency, with which said second vibration element is caused to vibrate; and/or
the second resonant frequency is less than a first resonant frequency, especially in such a manner that the second resonant frequency is less than 90% of the first resonant frequency; and/or
said first and said second vibration elements are mechanically decoupled from one another in such a manner that each of the two vibration elements can vibrate independently of the respective other vibration element, and/or in such a manner that a lowest mechanical eigenfrequency of said first vibration element differs from a lowest mechanical eigenfrequency of said second vibration element; and/or
said first vibration element is formed by means of at least two measuring tubes; and/or
said second vibration element is formed by means of at least two curved measuring tubes.

17. The measuring system as claimed in claim 1, further comprising:
a housing with a first housing end connectable to a first line segment of the pipeline and with a second housing end connectable to a second line segment of the pipeline, wherein:
at least said first vibration element is accommodated within a lumen of said housing.

18. The measuring system as claimed in claim 17, wherein:
both said first as well as also said second vibration element are accommodated within the same lumen of said housing.

19. The measuring system as claimed in claim 17, wherein:
said second vibration element is held on said housing.

20. The measuring system as claimed in claim 16, wherein:
said second vibration element is held on said housing in such a manner that said second vibration element is arranged on an outside of said housing.

21. The measuring system as claimed in claim 16, wherein:
said first housing end includes at least a first flow opening of first type, namely a first flow opening communicating with said first vibration element, and
said second housing end includes at least a first flow opening of first type, namely a first flow opening communicating with said first vibration element.

22. The measuring system as claimed in claim 21, wherein:
said first housing end includes at least a second flow opening of first type, namely a second flow opening communicating with said first vibration element; and
said second housing end includes includes at least a second flow opening of first type, namely a second flow opening communicating with said first vibration element.

23. The measuring system as claimed in claim 22, wherein:
said first vibration element is formed by means of a first measuring tube, which communicates with a first tube end with the first flow opening of first type of said first housing end and with a second tube end with the first flow opening of first type of said second housing end, as well as by means of a second measuring tube; and
said second measuring tube communicates with a first tube end with the second flow opening of first type of said first housing end and with a second tube end with the second flow opening of first type of said second housing end.

24. The measuring system as claimed in claim 21, wherein:
said first housing end includes a flow opening of second type, namely a flow opening communicating with said second vibration element; and
said second housing end includes a flow opening of second type, namely a flow opening communicating with said second vibration element.

25. The measuring system as claimed in claim 21, wherein:
said first housing end includes a first flow opening of second type, namely a flow opening communicating with said second vibration element, as well as a second flow opening of second type, namely a flow opening likewise communicating with the second vibration element.

26. The measuring system as claimed in claim 1, further comprising:
a first temperature sensor, for registering a temperature of said first vibration element and adapted to generate a first temperature signal dependent on said temperature of said first vibration element, as well as
a second temperature sensor, for registering a temperature of said second vibration element and adapted to generate a second temperature signal dependent on said temperature of said second vibration element, wherein:
said measuring and operating electronics is adapted to generate the measured value representing the volume flow rate by means of the first temperature signal and/or by means of the second temperature signal; and/or
said measuring and operating electronics is adapted to generate the measured value representing the volume flow by means of the first temperature signal and/or by means of the second temperature signal.

27. The measuring system as claimed in claim 1, further comprising:
at least one deformation sensor, for registering elastic deformation of said first vibration element, which deformation sensor is adapted to generate a deformation signal dependent on said deformation of said first vibration element, wherein:
said measuring and operating electronics is adapted to generate the measured value representing the volume flow rate by means of the deformation signal; and/or
said measuring and operating electronics, is adapted to generate the measured value representing the volume flow by means of the deformation signal.

28. The measuring system as claimed in claim 1, wherein:
said first vibration element is formed by means of at least one straight measuring tube.

29. The measuring system as claimed in claim 1, wherein:
said first vibration element is formed by means of at least one measuring tube insertable into the course of the pipeline.

30. The measuring system as claimed in claim 1, wherein:
said first vibration element is formed by means of at least one measuring tube exhibiting a caliber greater than 20 mm.

31. The measuring system as claimed in claim 1, wherein:
said second vibration element is formed by means of at least one curved measuring tube.

32. The measuring system as claimed in claim 1, wherein:
said second vibration element is formed by means of at least one measuring tube bypassing said first vibration element.

33. The measuring system as claimed in claim 1, wherein:
said second vibration element is formed by means of at least one measuring tube exhibiting a caliber of less than 50 mm.

34. The measuring system as claimed in claim 1, wherein:
the measuring and operating electronics is formed by means of two mutually communicating electronics modules.

35. The measuring system as claimed in claim 3, wherein:
said second vibration element is adapted to be caused to vibrate with the second resonant frequency.

36. The measuring system as claimed in claim 3, wherein:
said second vibration element is adapted to guide in its lumen a part of the medium flowing with a second mass flow rate in such a manner that the second mass flow rate, with which the part of the medium guided in the lumen of said second vibration element flows, is less than the first mass flow rate, with which the part of the medium flows guided in the lumen of said first vibration element.

37. The measuring system as claimed in claim 8, wherein:
said measuring and operating electronics is adapted to generate said second driver signal for said second oscillation exciter simultaneously with the first driver signal.

38. The measuring system as claimed in claim 8, wherein:
said measuring and operating electronics is adapted to generate said second driver signal for said second oscillation exciter in such a manner that the signal frequency of the second driver signal deviates by more than 10 Hz from the signal frequency of the first driver signal and/or that the signal frequency of the second driver signal is less than 90% of the signal frequency of the first driver signal.

* * * * *